US009900178B2

(12) United States Patent
Ylimartimo

(10) Patent No.: US 9,900,178 B2
(45) Date of Patent: Feb. 20, 2018

(54) DEVICE ARRANGEMENT AND METHOD FOR IMPLEMENTING A DATA TRANSFER NETWORK USED IN REMOTE CONTROL OF PROPERTIES

(71) Applicant: TOSIBOX OY, Oulu (FI)

(72) Inventor: Veikko Ylimartimo, Oulu (FI)

(73) Assignee: TOSIBOX OY, Oulu (FI)

( * ) Notice: Subject to any disclaimer, the term of this patent is extended or adjusted under 35 U.S.C. 154(b) by 414 days.

(21) Appl. No.: 14/370,872

(22) PCT Filed: Jan. 7, 2013

(86) PCT No.: PCT/FI2013/050011
§ 371 (c)(1),
(2) Date: Jul. 7, 2014

(87) PCT Pub. No.: WO2013/104823
PCT Pub. Date: Jul. 18, 2013

(65) Prior Publication Data
US 2015/0146567 A1    May 28, 2015

(30) Foreign Application Priority Data

Jan. 9, 2012 (FI) ..................................... 20125022

(51) Int. Cl.
H04L 12/46    (2006.01)
H04L 29/06    (2006.01)
(Continued)

(52) U.S. Cl.
CPC ...... *H04L 12/4641* (2013.01); *H04L 41/0806* (2013.01); *H04L 61/2567* (2013.01);
(Continued)

(58) Field of Classification Search
CPC ........................ H04L 12/4641; H04L 41/0806
See application file for complete search history.

(56) References Cited

U.S. PATENT DOCUMENTS

| 7,590,074 B1 | 9/2009 | Dondeti et al. |
| 2003/0018805 A1 | 1/2003 | Meyerson |

(Continued)

FOREIGN PATENT DOCUMENTS

| CN | 101969435 A | 2/2011 |
| EP | 1170925 A1 | 1/2002 |

(Continued)

OTHER PUBLICATIONS

Chinese Office action dated Apr. 29, 2015 in the corresponding Chinese patent application No. 201380012759.5, and an English language translation of the Action.

(Continued)

*Primary Examiner* — Andrew Chriss
*Assistant Examiner* — Voster Preval
(74) *Attorney, Agent, or Firm* — Volpe and Koenig, P.C.

(57) ABSTRACT

In a remote control method, a virtual private network is established between a home control network key and a home control network device of the remote control system in a property. In order to establish the virtual private network both the home control network key and device determine their network paths to the Internet from the data transfer network to which they are connected. The determined network paths are stored in a home control network server on the Internet. When it is desired to form a virtual private network, the home control network server supplies the stored network paths to the home control network key and the home control network device. By utilizing the received network paths the home control network key and the home control network device start establishing a virtual private network between them with several known by them establishing methods of a data transfer connection.

16 Claims, 8 Drawing Sheets

(51) Int. Cl.
   *H04L 29/12*    (2006.01)
   *H04L 12/24*    (2006.01)
(52) U.S. Cl.
   CPC ...... *H04L 61/2575* (2013.01); *H04L 63/0272* (2013.01); *H04L 69/165* (2013.01); *H04L 61/2514* (2013.01)

(56) References Cited

U.S. PATENT DOCUMENTS

| | | | |
|---|---|---|---|
| 2004/0162992 A1* | 8/2004 | Sami ................ | H04L 29/12 726/13 |
| 2005/0120204 A1 | 6/2005 | Kiwimagi et al. | |
| 2005/0164727 A1 | 7/2005 | Hasegawa | |
| 2008/0034416 A1* | 2/2008 | Kumar ............... | H04L 63/0272 726/15 |
| 2010/0014529 A1 | 1/2010 | Takechi et al. | |
| 2010/0325719 A1* | 12/2010 | Etchegoyen ....... | H04L 63/0272 726/15 |
| 2011/0019654 A1* | 1/2011 | Harmatos ........... | H04W 92/02 370/338 |
| 2011/0219123 A1 | 8/2011 | Yang et al. | |
| 2013/0081132 A1* | 3/2013 | Lee .................... | H04L 63/0272 726/15 |

FOREIGN PATENT DOCUMENTS

| | | |
|---|---|---|
| EP | 1912413 A1 | 4/2008 |
| JP | 2005217584 A | 8/2005 |
| JP | 2010258969 A | 11/2010 |
| WO | 2007043381 A1 | 4/2007 |
| WO | 2012113975 A1 | 8/2012 |
| WO | 2012160257 A2 | 11/2012 |

OTHER PUBLICATIONS

Hsieh, C. "Lesson 1: Introduction to Protocols" [haettu Dec. 13, 2012] "Introduction to Computer Networks (CIS370)". Mar. 25, 2007, Knowledge Systems Institute. <URL: http://web.archive.org/web/20070325041316/http://pluto.ksi.edu/˜cyh/cis370/ebook/ch06b.htm>.

Ford et al., "Peer-to-Peer Communication Across Network Address Translators", 2005 SENIX Annual Technical Conference, pp. 1-14, Mar. 14, 2005 (Mar. 14, 2005).

Srisuresh Kazeon Systems B Ford M I T D Kegel Kegel COM P: "State of Peer-to-Peer (P2P) Communication across Network Address Translators (NATs); rfc5128.txt", Mar. 1, 2008, Mar. 1, 2008 (Mar. 1, 2008), XP015055197, ISSN: 0000-0003 Chapter 3.

Canadian Office action dated May 12, 2016 in the corresponding Canadian patent application No. 2,860,680.

European Office action dated Aug. 24, 2015 in the corresponding European patent application No. 13 73 5938.

English language translation of Japanese Office action dated Jan. 26, 2015 in the corresponding Japanese patent application No. 2014-550741.

* cited by examiner

DEVICE ARRANGEMENT AND METHOD FOR IMPLEMENTING A DATA TRANSFER NETWORK USED IN REMOTE CONTROL OF PROPERTIES

FIELD OF THE INVENTION

The invention relates to a method for providing a data transfer network required by the remote-controllable actuators in a property.

BACKGROUND

Remote-controllable devices and systems are increasingly being installed in properties and homes. The purpose of the systems is to secure and/or maintain such conditions in properties, so that living in them is both safe and pleasant. The spectrum of remote-controlled or remote-monitored devices is wide. The same property may have devices from several suppliers. These devices can often not communicate directly with each another. It is also common that each system has its operation logic, the remote controlling of which requires the use of a particular data communications solution.

Building service suppliers have lately started to solve the problem very generally by ordering from an operator for the customer target its own, separately costing additional connection, which contains certain target-specific agreed-on features and must be separately maintained, either via a telephone network or a broadband network, which broadband network can be a permanent of wireless 2G/3G network broadband connection. Most suppliers have found this to be the easiest mode of operation for them at the moment, even though it contains several problematic points.

If a new additional connection is provided for the target, data communications matters must often be agreed upon separately with an administrator of the local intranet. The intranet administrator probably has to make additional network configurations for the connection, so that establishing a remote connection can succeed.

One can try to solve remote use of the target also with an application-specific solution. Thus the device supplier can buy from the operator its own radio network and form in it a private access point name (APN), which determines data communications settings in GPRS (General Packet Radio Service) and HSDPA (High Speed Downlink Packet Access)/HSUPA (High Speed Uplink Packet Access) networks. By using APN settings, an Internet connection is provided via a wireless 2G/3G/4G network to the devices in the target. In such cases, the user must pay separately for the connection and for the interface modems and programs enabling its remote use. Often such an additional connection cannot or may not be used for more than one use purpose, for example for the remote use of devices supplied by the building service supplier. Additionally, operators nowadays generally limit the maximum amount of data transfer in such connections, which when exceeded may cause large additional invoices for the connection owner.

In housing cooperative type targets, which have several properties, the properties may be connected to "remote use" taking place only within the intranet formed between the properties. No real remote contact is obtained for such targets, if the remote contact user is physically elsewhere than in one of the properties in question in the intranet.

It is an object of the invention to provide a new encrypted data transfer arrangement required by the remote control arrangement of the technical devices in the property, where the Internet connection already existing in the properties and homes is utilised as such in the remote use of the building service and surveillance. With the establishing method of the data communication connection according to the invention the destination connection of the property is altered to be as such suitable for remote use. Already existing functions of the data network connection in the target and the intranet in the target are not altered.

SUMMARY

The objects of the invention are achieved with an establishing method of a data transfer connection, in which a home control network device installed in a fixed manner in a property and a home control network key of a person realising monitoring of the property establish a secure two-way connection over the Internet based on contact information they have received from a home control network server according to the invention. The home control network device in the property, to which the devices to be remote-controlled or remote-monitored in the property are connected, are connected to a data network interface device/network terminal in the property, for example a modem.

The current IP addresses of the home control network device and the home control network key are maintained in the home control network server related to the invention, which IP addresses are used for establishing a connection between said devices. Due to the connection establishing methods according to the invention both said devices can be connected to some private, non-public network, and they can still establish among themselves a secure data transfer connection over the Internet. Advantageously, it is enough for establishing the data transfer connection over the Internet between the mobile home control network key and the fixed installed home control network device that said devices at some point in the established connection also obtain a public IP address, even though simultaneously the home control network device and the home control network key only have non-public IP addresses. In a preferred embodiment of the invention, the home control network server does not participate in the establishing of the actual data transfer connection after it has sent the IP addresses of the devices to be available to the devices.

An advantage with the establishing method of the data transfer connection utilized in remote control system according to the invention in a property is that both the devices in the home control network device pair can search their routing from their placement location to the IP address of the device of the property connecting to the Internet and store the searched route in a separate home control network server on the Internet for the identification and IP address of the device pairs.

It is further an advantage of the invention that each home control network device pair according to the invention forms independently among themselves a predetermined unique device pair or device group, which identify each other in the data transfer network to be established. Due to the identification method the home control network key carried with the user or a computer program installed in some data processing device, which computer program implements the functions of a home control network key, establishes a network connection only with its own unique home control network device pair, and the connection cannot be established with any other network device.

It is further an advantage of the invention that the device pair of the remote control system according to the invention can among themselves independently with the aid of the address information of the home control network server establish a data link layer (Layer 2) level or also a network layer (Layer 3) level data transfer connection according to a direct two-way secure OSI model (Open Systems Interconnection Reference Model) through the serving local network devices and the Internet (VPN; Virtual Private Network).

It is further an advantage of the invention that the home control network device pair can establish among themselves a secure data transfer connection also through such firewalls that change occasionally either their source or destination ports.

The establishing method of a virtual private network between two network terminals of a home control network according to the invention is characterised in that both the first network terminal and the second network terminal that form a predetermined network terminal pair, the members of which are allowed to communicate only with each other, send at times a poll to the home control network server, in which it is asked whether the other device of the device pair is connected to the data transfer network, and if it is, then both the first network terminal and the second network terminal connect to the home control network server to establish a virtual private network and request the routing information from the home control network server in order to establish an end-to-end data transfer connection between said network terminals the home control network server sends both to the first network terminal and the second network terminal the requested routing information after it has checked that the network terminals are the predetermined network terminal pair, and that the first network terminal and the second network terminal start with several known establishing methods of a virtual private network an establishing process of an end-to-end data transfer connection in order to provide at least one virtual private network.

The home control network key according to the invention to be connected to the virtual private network is characterised in that it may include a processor, a memory and a computer program code stored therein, that are configured to send at times a poll to the home control network server, in which it is asked whether the home control network device predetermined to be the network terminal pair of the home control network key and with which home control network device the home control network key is allowed to communicate, is connected to the data transfer network, and if it is, then connect to the home control network server and to request the routing information of the home control network device from the home control network server in order to establish a virtual private network to the home control network device receive the routing information of the home control network device from the home control network server and start with several known establishing methods of a virtual private network an establishing process of an end-to-end data transfer connection in order to provide at least one virtual private network with the home control network device.

The home control network device according to the invention in a property and which is to be connected to the virtual private network is characterised in that its processor, memory and computer program code stored therein are configured to send at times a poll to the home control network server, in which it is asked whether the home control network key predetermined to be the network terminal pair of the home control network device and with which home control network key the home control network device is only allowed to communicate, is connected to the data transfer network, and if it is, connect to the home control network server and to request the routing information of the home control network key from the home control network server in order to establish a virtual private network to the home control network key receive the routing information of the home control network key from the home control network server, and start with several known establishing methods of a virtual private network an establishing process of an end-to-end data transfer connection in order to provide at least one virtual private network with the home control network key.

The computer program according to the invention, utilised in a home control network key, is characterised in that it comprises code means for sending at times a poll to the home control network server, in which it is asked whether the home control device with which the home control network key forms a predetermined terminal pair, the members of which are allowed to communicate only with each other, is connected to the data transfer network, and if it is, then code means for making a connection to the home control network server and for requesting the routing information of the home control network device from the home control network server in order to establish a virtual private network to the home control network device code means for receiving the routing information of the home control network device from the home control network server, and code means for starting with several known establishing methods of a virtual private network an establishing process of an end-to-end data transfer connection in order to provide at least one virtual private network with the home control network device.

The computer program according to the invention, utilised in a home control network device, is characterised in that it comprises code means for sending at times a poll to the home control network server, in which it is asked whether the home control network key, with which the home control network device forms a predetermined network terminal pair, the members of which are allowed to communicate only with each other, is connected to the data transfer network, and if it is, code means for making a connection to the home control network server and for requesting the routing information of the home control network key from the home control network server in order to establish a virtual private network to the home control network key code means for receiving the routing information of the home control network key from the home control network server, and code means for starting with several known establishing methods of a virtual private network an establishing process of an end-to-end data transfer connection in order to provide at least one virtual private network with the home control network key.

Some advantageous embodiments of the invention are presented in the dependent claims.

The basic idea of the invention is the following: In order to implement remote control in some property a device pair, a home control network device and a home control network key (device) have been manufactured, where at least one home control network device and at least one home control network key (device) can establish a secure data transfer connection only with each other. Said home control network key (device) may either be a separate electronic device manufactured for this purpose or it may also be some data processing device, in which a computer program according to the invention has been installed, which program implements the home control network key functions.

The home control network device in the property to be remote-controlled is installed in an existing intranet network or Internet network in the property to be controlled. It establishes one subnetwork, a control intranet network, in the intranet or Internet network, to which control intranet network various actuators to be controlled in the property are connected either with a wired or wireless data transfer connection.

In one advantageous embodiment of the invention an individual home control network key or several home control network keys can function as the device pair of two or more home control network devices in different properties. The identification codes of the home control network device and the home control network key are stored in said devices in connection with their manufacturing, or said devices change their identification codes when they are connected for the first time for example at their USB ports. By using the identification codes the home control network device and the home control network key establish a two-way secure data transfer connection between them.

In connection with the start-up, both devices determine routing information of the devices from their location network all the way to a network terminal connected to the Internet, which routing information is needed for the connection establishment. This routing information is stored in a home control network server according to the invention, connected to the Internet. When the home control network key (device) wants to establish a data transfer connection via the Internet to its device pair in some property, it retrieves the routing information of the home control network device functioning as its pair from the home control network server. By utilising the obtained routing information the home control network key starts the establishing process of a direct end-to-end data transfer connection, by which process advantageously a secure virtual private network (VPN) is established between the home control network key and the home control network device. In this establishment of the data transfer connection suitable data transfer protocols are used as required.

It can be attempted to establish an end-to-end data transfer connection advantageously first as a TCP-based data transfer connection or as a UDP-based data transfer connection, if this is allowed by the data transfer network components between the devices.

If the data transfer connection to be established has network components (e.g. firewalls) that change their source and/or destination ports occasionally in order to prevent network attacks, then it is attempted to establish an end-to-end data transfer connection advantageously, in addition to the above-mentioned, also by using UDP port scanning. Besides the UDP port scanning, it can be attempted to establish an end-to-end data transfer connection also by using the ICMP protocol.

If for one reason or other a direct end-to-end data transfer connection cannot be established with the above-mentioned protocols, a TCP-protocol-based secure tunnel is established through a home control network server related to the invention. In this embodiment, the home control network server does not encrypt the secure messages received by it, but passes them as such directly to the receiving device. If it is found during this established TCP relaying connection, that it would be possible to establish a VPN data transfer connection, then the data transfer is advantageously changed to this other two-way end-to-end data transfer connection.

When either a direct data transfer connection or a data transfer connection, relayed through the home control network server has been established, a direct VPN data transfer connection has been established between the home control network key and the home control network device in the property.

A home control network device according to the invention is installed in the internal data transfer network of a property to be remote-controlled between an existing internal data transfer network related to control and management of the property and a network terminal relaying traffic from the property to the Internet. All devices related to property control are connected to the inputs of the home control network device and the output of the home control network device is connected to the input meant for the intranet device of the network terminal relaying Internet traffic.

In a home control network system according to the invention the home control network key is a device of a network terminal and a suitable data processing device, connected either wireless or by means of a cable connection.

In another embodiment according to the invention the home control network key can be connected to some data processing device connected to the Internet. Possible data processing devices are, for example, a PC, a tablet computer or a smartphone. In this embodiment, the connection of the home control network key to the data processing device can be done for example with the aid of a LAN interface (Local Area Network), a WLAN interface (Wireless LAN), a WAN interface (Wide Area Network), a USB interface (Universal Serial Bus) or an antenna interface.

In one advantageous embodiment of the invention, the computer program implementing the functions of the home control network key is stored on a portable data storage means, for example a USB stick, from which the computer program can be installed into a suitable data processing device. The program installed in the data processing device simulates all the functions of the home control network key.

BRIEF DESCRIPTION OF THE DRAWINGS

In the following, the invention will be described in detail. In the description, reference is made to the enclosed drawings, in which.

DETAILED DESCRIPTION OF THE
PREFERRED EMBODIMENTS

The embodiments in the following description are given as examples only, and someone skilled in the art may realise the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1A:
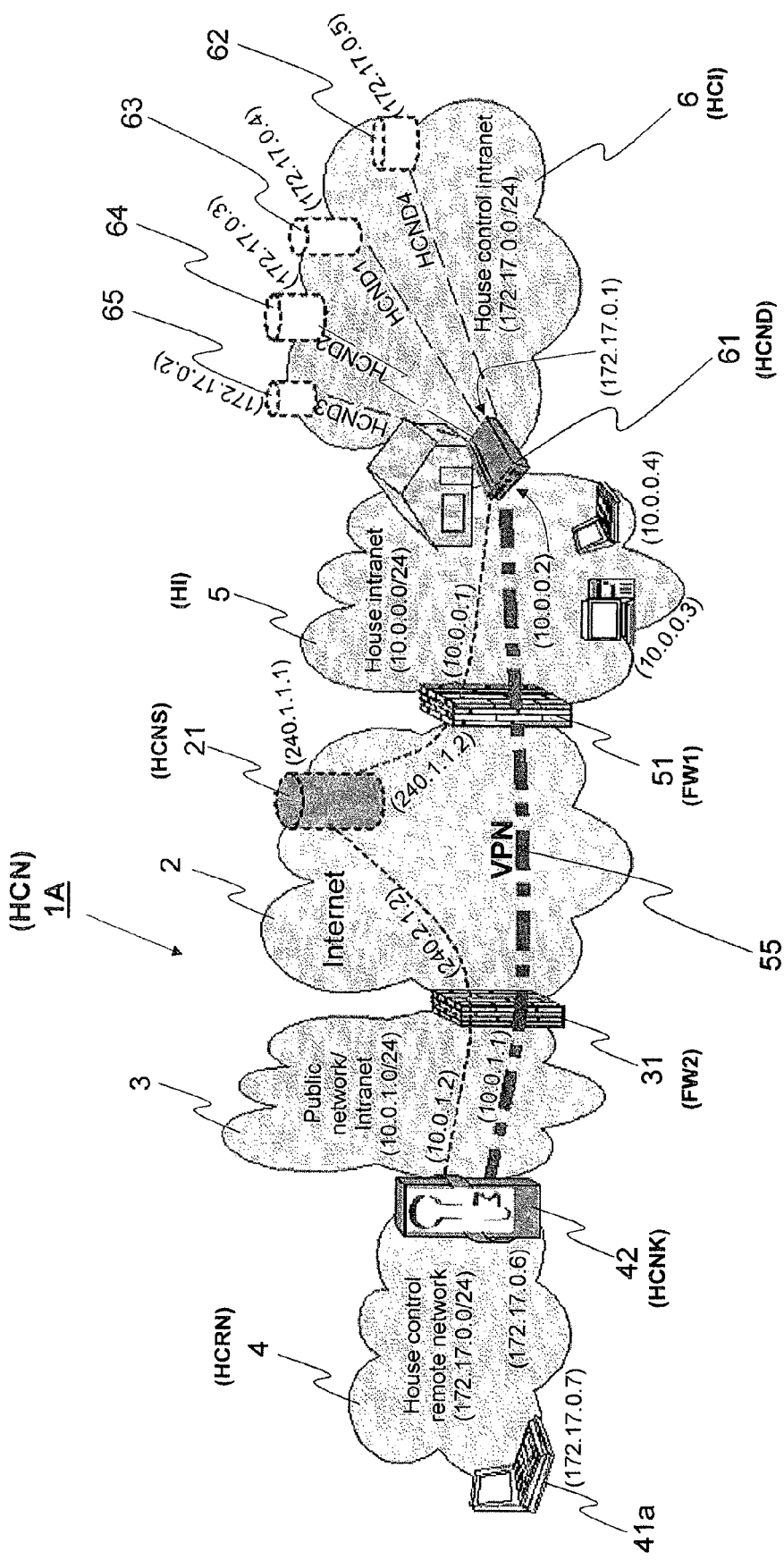
FIG. 1a shows by way of example how a two-way data transfer connection according to the invention can be established between a client device handling remote control and an individual control or management device of a property.
Figure 1B:
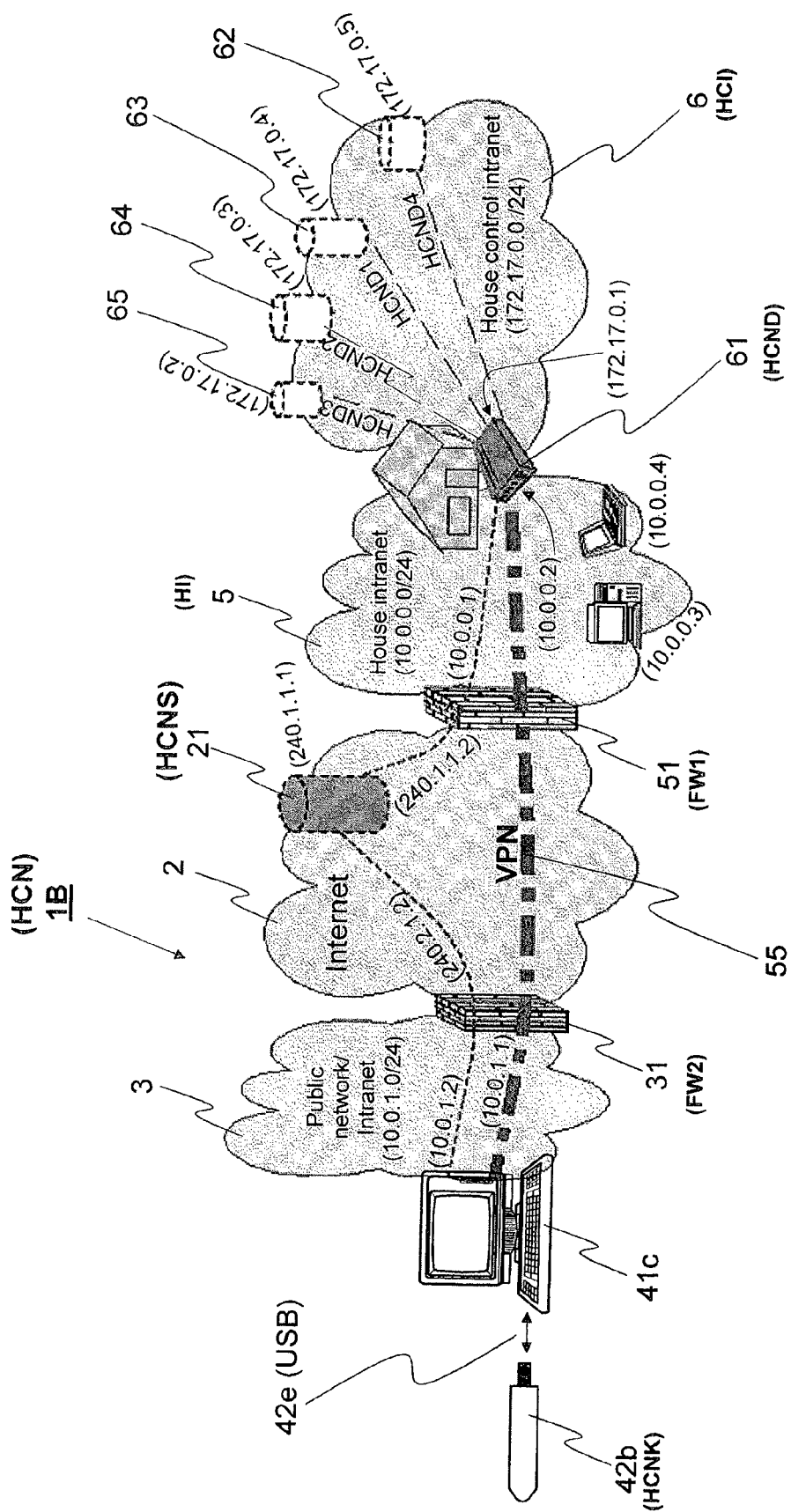
FIG. 1b shows another example according to the invention, in which a two-way data transfer connection can be established between a client device handling remote control and an individual control or management device of a property.

FIGS. 1a and 1b show two advantageous embodiments 1A and 1B of the remote control system according to the invention. In the examples of FIGS. 1a and 1b one home control network key 42, 42b or a data processing device 41c, which has been converted by software into a home control network key, is used to establish a data transfer connection to one home control network device 61 in some property. The home control network key 42, 42b or the data processing device 41c converted into a home control network key according to the invention can however advantageously also function with separate home control network devices in two or more properties.

In both embodiments of FIGS. 1a and 1b the data transfer network mainly has the same basic network structure. In both Figures the Internet is shown with reference 2. Some public network or an intranet, reference 3, is also connected to the Internet 2. The network 3 may be a fixed or a wireless data transfer network. In FIG. 1a, a first data transfer network 4, the house control remote network of the property, is connected to the network 3, to which house control remote network the client device implementing the remote control, reference 41a, can be connected. In FIG. 1b, the home control network key 42b is connected to the data processing device 41c, which again is connected to a public network/intranet network 3.

When a home control network device 61 or a home control network key 42, 42b is connected to its own local data transfer network, it sends at times a poll to the home control network server 21 belonging to the remote control system, in order to find out whether its own counterpart device is connected to the network or not. If it becomes evident from the reply sent by the home control network server 21 that the counterpart device is connected to its own data transfer network, both members of the device pair start the establishing process of a virtual private network (VPN data transfer connection) by procedures described below.

The house intranet in the property to be remote-controlled is in FIGS. 1a and 1b designated with reference 5. A second data transfer network 6, a house control intranet, is connected to the house intranet network 5. The actuators 62-65 to be remote-controlled in the property are connected to the house control intranet.

It is evident to someone skilled in the art that there may also be more subnetworks between the home control network device 61 and/or the home control network key 42, 42b or 41c according to the invention and the Internet 2 than what is shown in FIGS. 1a and 1b.

In the examples of FIGS. 1a and 1b, the second network terminal according to the invention, the home control network device 61 (HCND), is connected to the house intranet network 10.0.0.0/24, reference 5. The house intranet network 5 is connected to the Internet 2 with network terminal 51. The network terminal 51 can be a router, a modem or a firewall, which can include also a network address translator NAT. In the examples of FIGS. 1a and 1b the house intranet 5 is behind a firewall FW1, reference 51, containing a NAT function. The public IP address of the firewall FW1 in the examples of FIGS. 1a and 1b is 240.1.1.2. In the house intranet 5 the internal IP address of the firewall FW1 is 10.0.0.1. Two exemplary other data processing devices are also connected to the house intranet network 5, the IP addresses of which in the house intranet network are 10.0.0.3 and 10.0.0.4.

The house control intranet network 172.17.0.0/24 (HCI), reference 6, is connected to the house intranet network 5 via the home control network device 61. The IP address of the home control network device 61 in the house control intranet network is 172.17.0.1 and in the house intranet network 10.0.0.2. In the examples in FIGS. 1a and 1b, four exemplary devices/servers 62, 63, 64 and 65 are connected to the house control intranet 6. The devices/servers can be connected to the house control intranet 6 either with a permanent connection or a wireless data transfer connection.

Reference 62 shows a lighting control webserver, the IP address of which in the house control intranet network is 172.17.0.5. For a remote user the lighting control webserver 62 is seen as device HCND4.

Reference 63 shows a heat control webserver, the IP address of which in the house control intranet network is 172.17.0.4. For a remote user the heat control webserver 63 is seen as device HCND1.

Reference 64 shows a surveillance camera webserver, the IP address of which in the house control intranet network is 172.17.0.3. For a remote user the surveillance camera webserver 62 is seen as device HCND2.

Reference 65 shows an air-conditioning webserver, the IP address of which in the house control intranet network is 172.17.0.2. For a remote user the air-conditioning webserver 65 is seen as device HCND3.

In the example of FIG. 1a the first network terminal according to the invention, the home control network key 42 (HCNK), is connected to the house control remote network 172.17.0.0/24, reference 4. The house control remote network 4 is behind the intranet 3 firewall FW2, reference 31. The public IP address of the NAT firewall 31 is in this example 240.2.1.2 and the internal IP address of the NAT firewall is 10.0.1.1.

The house control remote network 172.17.0.0/24 (HCRN), reference 4, is connected to the data transfer network 3 via a home control network key 42 according to the invention The IP address of the home control network key 42 in the intranet network is 10.0.1.2 and in the house control remote network 172.17.0.6. In the examples of FIGS. 1a and 1b, an exemplary data processing device 41a has been connected to the house control remote network 4, the IP address of which data processing device in the house control remote network 4 is 172.17.0.7. This data processing device 41a is used, when it is desired to remotely control devices/servers 62, 63, 64 or 65 connected to the house control intranet network 6.

The home control network key 42 and the home control network device 61 according to the invention need each other's routing information, in order for them to be able to establish between them a data transfer connection based either on a data link layer or on a network layer, in the examples of FIGS. 1a and 1b a VPN data transfer connection 55. The determined routing information is stored by both the home control network key 42 and the home control network device 61 according to the invention in a home control network server 21 (HCNS) on the Internet.

In the example of FIG. 1a the NAT firewalls do not completely restrict outgoing UDP communication. They are so-called NAT firewalls in one state and "with memory", which also do not change the source port numbers of UDP connections (User Datagram Protocol) unforeseeably, if they do not have to. In the example of FIG. 1a the object is to establish in the data link layer an Ethernet level connection between the home control network key 42 and the home control network device 61.

When in the remote control system 1A according to FIG. 1a it is desired to establish a data transfer connection 55 belonging to a virtual private network (VPN) between the devices, then both devices 42 and 61 retrieve from the home control network server 21 the routing information stored therein by the counterpart device. Before handing over the routing information, the home control network server 21 checks that it is really a question of an allowed home control network key/home control network device pair. With the aid of the retrieved routing information the home control network key 42 and the home control network device 61 establish a direct VPN connection between them. When the VPN connection 55 is completed, a data processing device 41a in the house control remote network 4 can make contact with a device 62, 63, 64 or 65 in the house control network 6.

In order for it to be possible to establish the data transfer connection, the home control network key 42 and the home control network device 61 must determine their network path from their own network at least to the Internet 2. Below, the said network path information is referred to by term routing information. This network path determination can be made for example in the following manners, which the home control network key 42 and the home control network device 61 advantageously utilise.

In the example of FIG. 1a, the network routes are determined by the home control network key 42 and the home control network device 61. These devices store the discovered network paths on the home control network server 21, which stores them in its memory.

The home control network key 42 and the home control network device 61 according to the invention advantageously also have an ability to determine a free cyberspace. Said devices are configured to determine for themselves an available cyberspace automatically, by utilising the network path information on the home control network server 21. Said devices request the home control network server 21 to give some free part of the cyberspace. The home control network server 21 examines the network paths it has received and returns some network block, where not even one address is mentioned in the network path of any device known thereby.

The home control network device 61 also advantageously offers DHCP and DNS services in its own subnetworks 4 and 6 for devices connected thereto. Additionally the home control network key 42 and the home control network device 61 function as a default gateway for devices connected to the subnetwork.

FIG. 1b shows another remote control system 1B according to the invention. In FIG. 1b the data processing device 41c utilised by the user is connected to a data transfer network depicted with reference number 3. The embodiment of FIG. 1b differs from the embodiment of FIG. 1a in that the functions of the home control network key 42 of FIG. 1a are substituted with a home control network key 42b including a USB memory 42e, which can be connected to a data processing device 41c utilised by the client. In this embodiment, the data processing device 41c and the device 42b together function as the home control network key.

In another advantageous embodiment of the invention the computer program implementing the functions of a home control network key according to the invention is installed to the data processing device 41c. The computer program can advantageously be stored in the data processing device 41c for example from a USB memory stick by attaching the USB memory stick to a USB port in the data processing device 41c. For someone skilled in the art it is obvious that some other prior art data storage means can also be used as storage means for the computer program. In this embodiment, the data processing device 41c simulates a home control network key according to the invention with a computer program installed therein.

In the example of FIG. 1b, the home control network key 42 of FIG. 1a is simulated in its entirety or partly in the user's data processing device 41c. The user makes contact with this simulation software with a browser in his data processing device 41c, or alternatively, the simulation software opens a browser window in the data processing device 41c. The simulation is started by launching the simulation program according to the invention in the data processing device 41c, which simulation program implements all the functions of a physical home control network key 42 by software.

In this embodiment, all the functionalities of the home control network key 42 of FIG. 1a, communication, start-up and connection establishment, are implemented by utilising the user's data processing device 41c, whereby a physically separate home control network key 42 according to FIG. 1a is not needed for establishing a connection to a device pair 61 in the property.

If for some reason the establishment of the above described direct VPN tunnel is not successful between the home control network key 42, 42b or 41c and the home control network device 61 presented in FIGS. 1a and 1b or it is successful only occasionally (for example, if the network components change the source and/or destination ports occasionally), the remote control arrangements may utilise other access protocols described in connection with FIG. 3b. Also in this case, for the client device user the remote control system functions in the same way as in the remote control systems presented in FIG. 1a or FIG. 1b.

The following is an example of the operation of the remote control system 1A according to the invention in the example of FIG. 1a.

The Home Control Network Device 61:

The home control network device 61 is connected to the 10.0.0.0/24 network (the house intranet 5) for example by attaching a cable to the WAN port of the home control network device 61. The home control network device 61 automatically retrieves its IP settings with the DHCP procedure. A firewall FW1 in the house intranet network 5 advantageously functions as the DHCP server, which firewall gives the home control network device 61 the IP address 10.0.0.2 in a 24 bit network mask (255.255.255.0). The DHCP server also gives the default router address 10.0.0.1 and the DNS server address 10.0.0.1.

The home control network device 61 begins the communication by ascertaining with the aid of the DNS server the IP address of the home control network server 21 (HCNS, DNS address etahallinta.fi). The DNS server 10.0.0.1 gives the home control network server's 21 IP address as 240.1.1.1.

The home control network device 61 makes contact 240.1.1.1 with the home control network server 21 over the Internet with a TCP or UDP protocol. The home control network device 61 authenticates the mutual operational rights with the home control network server 21 with certificates and/or passwords determined in connection with manufacturing. This data transfer connection is advantageously encrypted for example with an SSL/TLS encryption. The home control network server 21 sees from the incoming connection the public IP address of the home control network device 61, which in the example of FIG. 1*a* is 240.1.1.2. The home control network device 61 notifies the home control network server 21 of its own address and network mask (10.0.0.2/24). The home control network server 21 stores this information in its Tosibox database.

The home control network device 61 advantageously also performs a traceroute operation toward the home control network server 21 and reports the discovered network path to the home control network server 21. The home control network server 21 stores the received network path of the home control network device 61 in its Tosibox database.

Next the home control network device 61 advantageously also performs an ICMP Record Route operation and reports the discovered route to the home control network server 21. The home control network server 21 stores the route received from the home control network device 61 in its Tosibox database.

Thereafter the home control network device 61 performs an automatic determination of free cyber space by sending an inquiry to the home control network server 21. The home control network server 21 returns to the home control network device 61 in the examples of FIGS. 1*a* and 1*b* the cyber space 172.17.0.0/24.

The home control network device 61 takes the cyberspace into use for its intranet 6, and as its own IP address the home control network device 61 takes 172.17.0.1. The home control network device 61 notifies the home control network server 21 about the taking into use, which server stores the information in its Tosibox database.

In FIGS. 1*a* and 1*b*, the home control network device 61 is shown as its own separate device, which establishes its own subnetwork for controlling devices in a property. It is obvious to someone skilled in the art that the functions of the home control network device 61 can be integrated as a part of a computerised or house engineering device, which has a sufficient processor and memory capacity and connecting means for connecting various technical means thereto either with a wired data transfer connection or a wireless data transfer connection.

The Home Control Network Key 42:

In the example of FIG. 1*a*, the WAN port of the home control network key 42 is connected to the 10.0.1.0/24 network (data transfer network 3). The home control network key 42 retrieves IP address information from the DHCP server, as which a firewall FW2 functions, reference 31. The home control network key obtains the IP address 10.0.1.2. The address of the default router 31 of the home control network key 42 is 10.0.1.1 and the address of the DNS server 31 is 10.0.1.1, which are obtained from the DHCP server.

Figure 2:
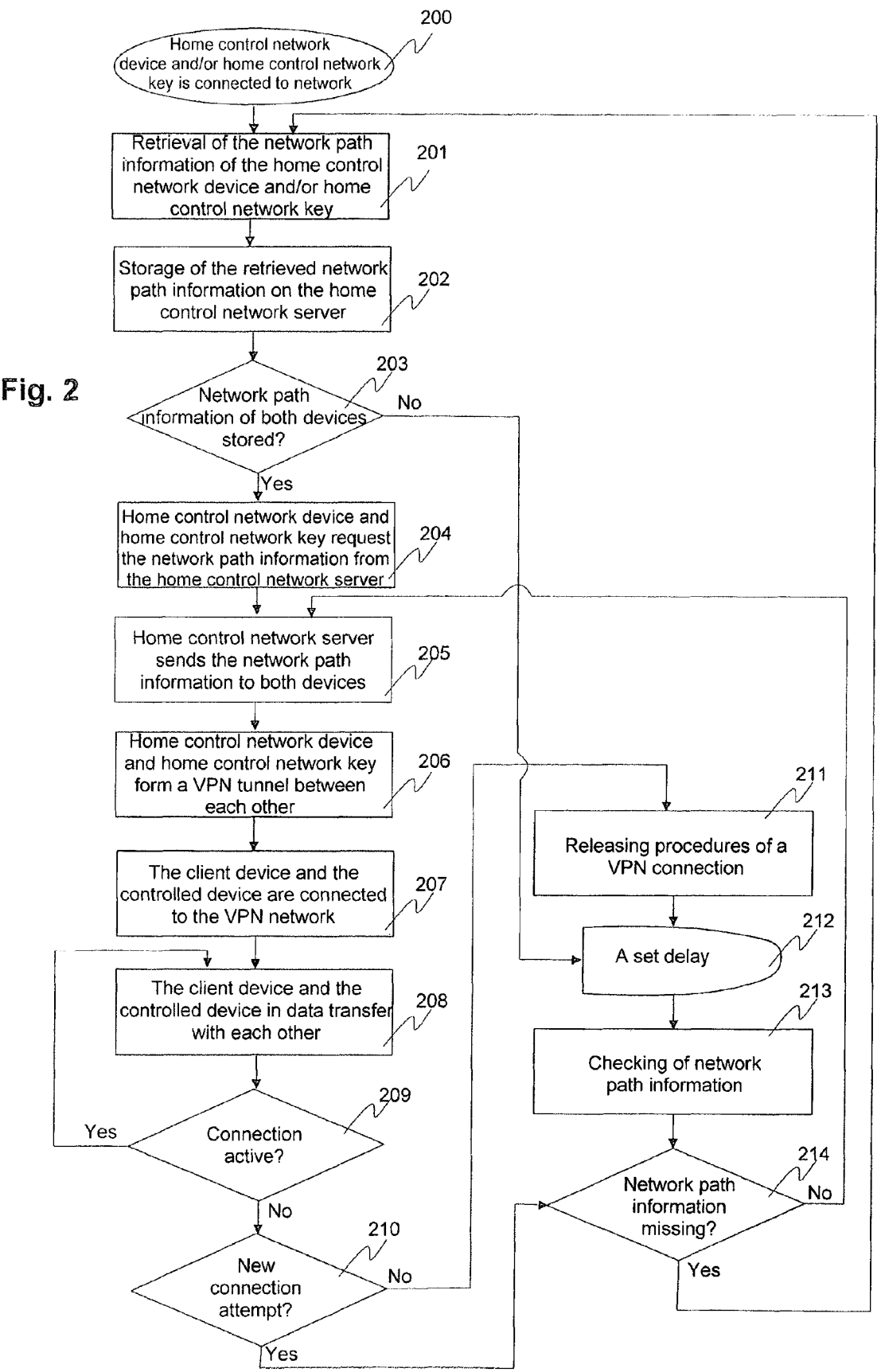
FIG. 2 shows as an exemplary flow chart, how a data transfer connection between the client device and the device in a property is established.

The home control network key 42 begins the communication by ascertaining with the aid of the DNS server the IP address of the home control network server 21 (HCNS, DNS address hcns.fi). In the examples of FIGS. 1 and 2, the DNS server 10.0.1.1 gives 240.1.1.1 as the IP address of the home control network server 21.

Thereafter the home control network key 42 contacts the home control network server 21 on address 240.1.1.1 over the Internet primarily with a UDP protocol, secondarily with a TCP protocol. The home control network key 42 authenticates mutual operational rights with the home control network server 21 with pre-distributed certificates and/or passwords. The data transfer connection is advantageously encrypted for example with an SSL/TLS encryption. The home control network server 21 sees from the incoming connection the public IP address 240.2.1.2 of the home control network key 42. The home control network key 42 additionally notifies the home control network server 21 of its own address and network mask 10.0.1.2/24. The home control network server 21 stores this information in its Tosibox database.

Next, the home control network key 42 performs a traceroute operation and reports the discovered network path to the home control network server 21, which stores the information in its Tosibox database.

The home control network key 42 advantageously also performs an ICMP record route operation and reports the discovered network path to the home control network server 21, which stores the information in its Tosibox database.

The home control network server 21 checks the received route information and if there are overlaps, the home control network server 21 reports them to the home control network key 42, which if necessary performs the automatic determination of free cyberspace again.

A Data Processing Device 41*c* as a Home Control Network Key:

In the embodiment 1B according to FIG. 1*b* the home control network key 42 can be replaced either with a home control network key 42*b* or a user's data processing device 41*c*, wherein a computer program comprising the functions of the home control network key has been stored from a suitable data storage means, for example a USB memory stick. Said home control network key 42*b* may advantageously be a so-called electronic device comprising a USB connection. In the embodiment of FIG. 1*b* the above-described functions of the home control network key 42 are performed by a computer program installed into the user's data processing device 41*c* from a USB memory stick.

In the embodiment according to FIG. 1*b*, the pairing of the home control network key 42*b* and the home control network device 61 can be determined either in connection with manufacturing or at the final use target. If the pair determination is done at the final use target, then the home control network key 42*b* is in the embodiment according to FIG. 1*b* temporarily connected to the home control network device 61. The connecting is advantageously implemented either by means of the devices' USB ports or via a wireless radio network.

Via the coupling the home control network key 42*b* and the home control network device 61 can receive the identification code of its device pair and send its own identification code to its device pair. Thereafter these two devices can establish a data transfer connection only with each other.

The transfer of the home control network key computer program to the user's user terminal 41*c* is advantageously implemented as follows.

When the home control network key 42*b* is momentarily attached by its connection to the data processing device 41*c*, then the computer program contained in the home control network key 42*b* with its individual identification codes is installed in the user's data processing device 41*c*, reference 42*e*. In connection with the installation the data processing device 41*c* user is asked whether he wants to take into use a protection function of the device and/or program. If it is desired to activate the protection function, then in this case the home control network key installation program requests that the user gives his password either only to the user's data processing device 41*c* or to the installed program or, if desired, to both.

The home control network key with its programs, individual identification codes and passwords can if desired also be stored for example on a well-protected internal network server, from where it can when necessary be moved back to a new home control network key (e.g. if the original key device is broken or lost).

In an advantageous embodiment of the invention the program contained in the home control network key 42*b* with its identification codes can also be stored on several data processing devices 41*c*, which may thus function in parallel with the first data processing device.

In an advantageous embodiment of the invention the computer program contained in the home control network key 42*b* may for example also be situated on a server on the Internet, from where it can be retrieved. In this advantageous embodiment the physical home control network key 42*b* itself may comprise only the identification code needed for identifying the device pair.

FIG. 2 shows as an exemplary flow chart the operations of the remote control method according to the invention after the home control network key 42 or 42*b* and the home control network device 61 have been paired together.

When a home control network device 61 or a home control network key 42, 42*b* is connected to its own local data transfer network, it sends/they send at times a poll (so called polling) to the home control network server 21 belonging to the remote control system, in order to find out whether its own counterpart device pair is connected to the network or not. If it becomes evident from the reply sent by the home control network server 21 that the counterpart device pair is connected to its own data transfer network, then both members of the device pair start the establishing process of a virtual private network (VPN data transfer connection) by procedures described later.

In step 200 the home control network device 61 is connected to the house intranet network 5 and advantageously also the home control network key 42 or the data processing device 41*c* supporting or simulating the home control network key 4*ab* to the intranet network 3. All devices to be remote-controlled in the property are connected to the home control network device 61 either with a permanent connection or a wireless connection.

In step 201 both the home control network device 61 and the home control network key 42, 42*b* or the data processing device 41*c* simulating the home control network key 41*c* determine their network path to the home control network server 21, if their present network path information is not up-to-date. The procedure used in step 201 is shown in more detail in FIG. 3*a*.

In step 302 both the home control network device and/or the home control network key 42, 4*a* or the data processing device 41*c* simulating the home control network key store their determined network paths on the home control network server 21, if the up-to-date network path information was able to be determined.

In step 203 the devices 42, 42*a* or 41*c* and 61 according to the invention to be utilised in the remote-controlling receive the information that their device pair has registered with the home control network server 21 or that the registration is missing. If the up-to-date network path information of the device 42, 42*b*, 41*c* or 61 according to the invention belonging to one of the device pairs is missing, then the remote control system 1A or 1B moves after a specified delay 212 to the listening and checking step 213 of the home control network server connection.

At the start of the connection establishing, both the home control network key 42/42*b* and the home control network device 61 request in step 204 the up-to-date network path information of the counterpart from the home control network server 21. The home control network server 21 checks that it is a question of a predetermined, allowed device pair, and after the checking it sends the network path information to both devices in step 205. Thereafter the home control network server 21 releases the connection to both devices 42/42*b* and 61 and thus it is no longer a part of the VPN tunnel 55 being formed.

In step 206 the home control network key 42/42*b*/41*c* and the home control network device 61 form a VPN tunnel 55 between them. The partial steps included in step 206 are described in more detail in FIG. 3*b*.

In step 207 both the user's client device 41*a* or 41*c* and the target device 62-65 in the property are connected to the established VPN network.

In the embodiment of FIG. 1*a*, the user's client device 41*a* is connected to the VPN network by the home control network key 42. In the embodiment of FIG. 1*b*, the home control network key 42*b* connected to the user's data processing device 41*c* is one of the end points of the VPN network. The device 62-65 to be remote-controlled in the target is connected to the VPN network by the home control network device 61.

In step 208 the user's client device 41*a* or 41*c* and the device 62-65 to be controlled in the property are part of the same VPN network, whereby they may exchange information between each other. After a delay specified in the remote control system, step 209 consists of checking whether the data transfer connection between the client device 41*a* or 41*c* and the target device 62-65 is still active. If the data transfer connection is active, the process returns to step 208 and the data transfer is allowed to be continued.

If it is found in step 209 that the VPN connection is no longer active, then a decision is made in step 210 regarding a possible new attempt at establishing a connection.

If it is decided in step 210 to make a new attempt at establishing a connection, then the process branches out to step 214. In step 214 it is checked whether the members know the up-to-date network paths of the counterpart. If the network path information is up-to-date, the process branches out to step 205, where the home control network server sends the up-to-date network path information of the counterpart to the devices according to the invention for establishing a VPN tunnel.

If it is found in step 214 that one of the network path details is missing or is not up-to-date, the process returns to step 201, where the determination of the network path information of one or both of the devices according to the invention is renewed.

In this alternative the process advantageously also includes necessary procedures for releasing the VPN connection, so that the connection establishing process according to the invention itself can be renewed successfully. The connection establishing is attempted according to a predetermined number.

If it is decided in step 210 that a new attempt to establish a VPN connection will not be made any more, because a predetermined number of connection establishing attempts have been made or it is for some other reason not desired to establish a VPN connection, then the process moves to step 211. In step 211 the used VPN data transfer network is released. This is the case for example when the home control network key is switched off.

After the VPN data transfer network is released, a predetermined delay 212 follows in the process utilised in the remote control system 1A or 1B. After the delay 212 the process moves to the listening function 213 of the home control network server. There at least the current-carrying home control network device 61 sends at times connection requests to the home control network server 21.

The home control network device 61 advantageously sends connection requests until the home control network server 21 sends the up-to-date network path information to it. When the network path information is received, the establishing process of the VPN connection starts in step 201.

The branching out to step 212 can take place also from step 203. This happens when the network path information of one or both have not been able to be determined and stored on the home control network server. Also this branch of the process returns after steps 231 and 214 back to step 201, where at least on of the devices participating in the remote-controlling attempts to determine its network path information and to store it on the home control network server 21.

Figure 3A:
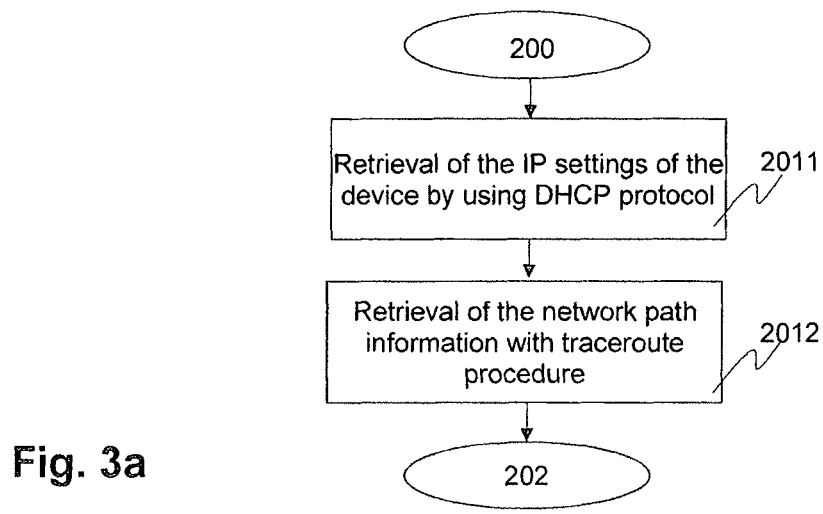
FIG. 3a shows by way of example the partial steps included in step 201 in FIG. 2.

The searching procedures used in step 201 are described in more detail in FIG. 3a.

In step 2011 is utilised with a DHCP protocol (Dynamic Host Configuration Protocol) the IP settings for the network interface of the data processing device can be retrieved. Settings obtainable with the DHCP procedure include at least the IP address of the data processing device, the network mask, the default gateway and the DNS server (Domain Name System), which transforms the domain names into IP addresses.

The Traceroute procedure utilised in step 2012 is a tool using the TCP/IP protocol that ascertains through which route or network path the packets move to the determined machine. In the Traceroute procedure a data transfer device connected to the network ascertains the network path by adding the Time to Live value (TTL) of the packets it sends one at a time, starting from zero.

Ascertaining the network path typically occurs in the following way. The data processing device sends to the default gateway an IP packet with some target address in the external network using the TTL value "0". The default gateway responds to this with a message of TTL expired. For example the IP address, delay etc. of the default gateway becomes clear from this message.

Thereafter the data processing device sends to the default gateway an IP packet with some target address in the external network using the TTL value 1. Again the router following the default gateway responds with a message "TTL expired", from which the IP address of this subsequent (second) router becomes clear. This transmission/response process is continued by increasing the TTL value until the desired goal is reached. In the case of the Internet the final goal is typically reached with a TTL value of 6-15. The final result is that the data processing device knows the network path to the outside world, for example the Internet.

An ICMP protocol (Internet Control Message Protocol) can be utilised in ascertaining external addresses. A Record Route flag of an ICMP packet is used in the ICMP procedure, which flag requests operating systems of the devices on the network path to record in the ICMP packet's title the IP address of the transmitting router.

Figure 3B:
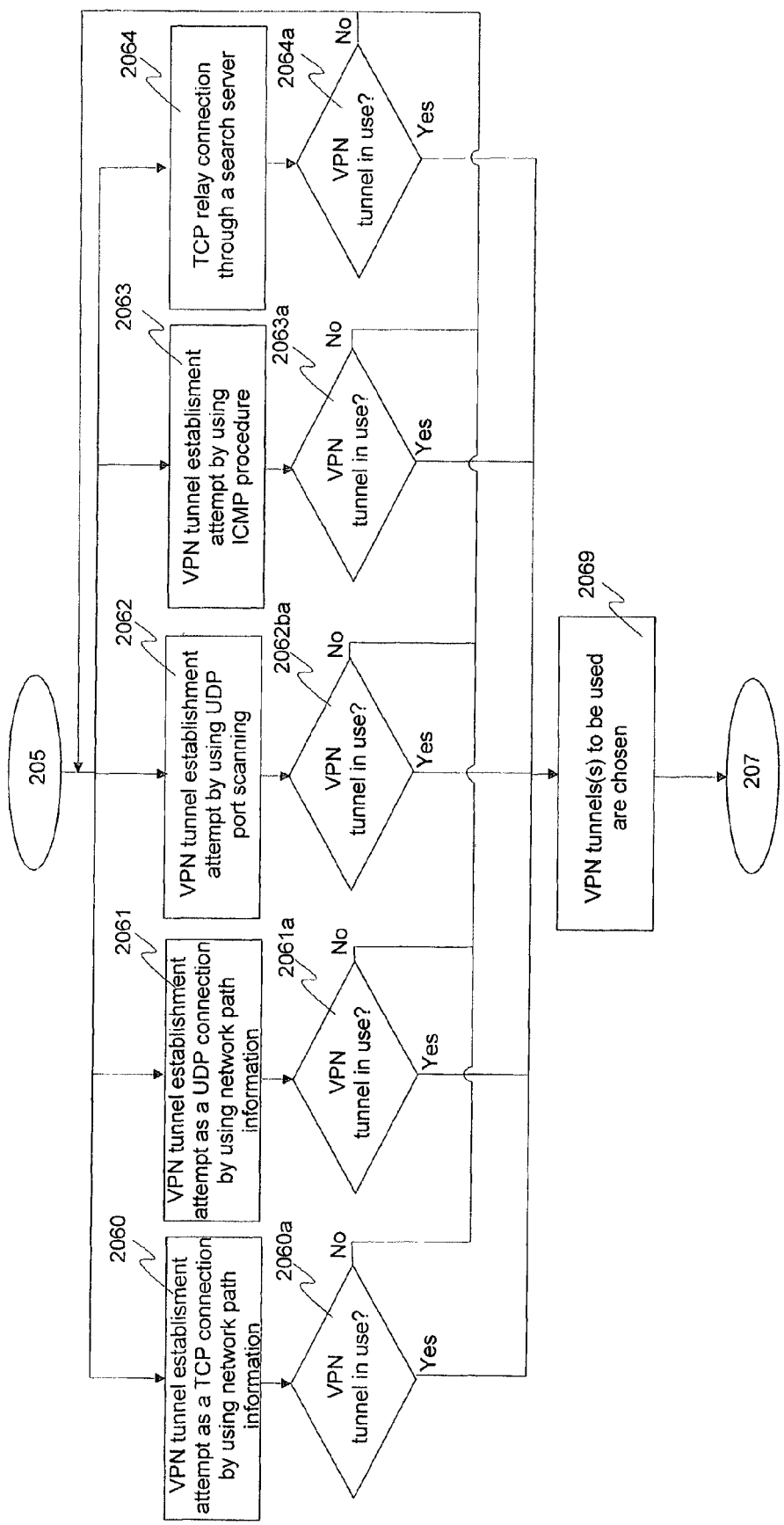
FIG. 3b shows by way of example the establishing step included in step 206 in FIG. 2.

FIG. 3b shows some of the connection establishment procedures 2060-2064 enabling the establishment of a VPN tunnel and utilised in step 206 in FIG. 2. In FIG. 3b the alternative connection establishment procedures are shown as parallel processes which are utilised simultaneously. The invention is however not limited to this embodiment, but connection establishment processes can be implemented also depending on the application in a suitable way as successive connection establishment processes. In this embodiment, even after one connection establishment of a VPN tunnel other connection establishment methods are not necessarily attempted to utilise.

The example of FIG. 3b shows five possible establishing methods of a VPN tunnel. With reference 2060 the establishing of a VPN tunnel by using TCP protocol is shown. If the elements of the communication network between the home control network device and the home control network key allow connection establishing, it is ascertained in step 2060a. If the connection cannot be established, the connection establishment is advantageously attempted again.

With reference 2061 the establishing of a VPN tunnel by using UDP protocol is shown. If the elements of the communication network between the home control network device and the home control network key allow connection establishing, it is ascertained in step 2061a. If the connection cannot be established, the connection establishment is advantageously attempted again.

With reference 2062 the establishing of a VPN tunnel by using UDP port scanning described later is shown. If the elements of the communication network between the home control network device and the home control network key allow connection establishing, it is ascertained in step 2062a. If the connection cannot be established, the connection establishment is advantageously attempted again.

With reference 2063 the establishing of a VPN tunnel by using ICMP procedure described later is shown. If the elements of the communication network between the home control network device and the home control network key allow connection establishing, it is ascertained in step 2063a. If the connection cannot be established, the connection establishment is advantageously attempted again.

With reference 2064 the establishing of a VPN tunnel by using the TCP relay procedure described later is shown. Advantageously, this procedure is utilised when the communication network elements between the home control network device and the home control network key do not allow establishing of a direct end-to-end VPN tunnel. Also in this procedure it is ascertained in step 2062a whether a secure data transfer connection was successfully established between the home control network device and the home control network key. If the connection cannot be established, the connection establishment is advantageously attempted again.

Every connection establishment procedure 2060-2064 can provide a VPN data transfer connection between the home control network device 61 and the home control network key 42 or 42b. In step 2069, the VPN tunnel or VPN tunnels is/are chosen, that is/are used as the data transfer connection.

All the process steps shown in FIGS. 2, 3a and 3b are implemented with program commands, which are performed in a suitable general-purpose or special-purpose processor. The program commands are stored on a storage medium utilised by the home control network device 61 and the home control network key 42, such as memories, from which the processor can retrieve and implement them. The references to a computer-readable medium can for example also contain special components, such as programmable USB Flash memories, logic arrays (FPLA), application-specific integrated circuits (ASIC) and signal processors (DSP).

Example of Establishing a VPN Tunnel by Using a UDP Protocol, Reference 2061, in the Arrangement of FIG. 1a:

The home control network key 42 begins the pairing-up process. It notifies the home control network server 21 that it wants to establish a data transfer connection to the home control network device 61 advantageously by using the UDP protocol. The home control network server 21 decides that the requested data transfer connection should be established with the following port numbers:

the home control network key: UDP source port 10500, UDP destination port 10501, target IP address 240.1.1.2 the home control network device: UDP source port 10501, UDP destination port 10500, target IP address 240.2.1.2

The home control network server 21 reports this information to the home control network key 42 and the home control network device 61.

Thereafter the home control network key 42 sends the UDP packet to the address 240.1.1.2 on source port 10500 to the destination port 10501. The sent packet gets through the firewall FW2, which contains a NAT function, because outgoing traffic is not strongly restricted. The FW2 firewall 31 remembers the UDP packet as a connection for the following X seconds with the contact information 10.0.0.2, 240.1.1.2, 10500 and 10501.

The UDP packet arrives at the FW1 firewall 51 in front of the home control network device 61, which firewall does not allow incoming traffic and it drops the packet. The packet does not arrive at the address 10.0.0.2.

The home control network device 61 sends a UDP packet to address 240.2.1.2 on source port 10501 to destination port 10500. The sent UDP packet gets through the FW1 NAT firewall 51, because outgoing traffic is not restricted. The FW1 firewall 51 remembers the UDP packet as a connection for the following X seconds with the contact information 10.0.0.2, 240.2.1.2, 10501 and 10500.

The UDP packet arrives at the FW2 firewall 31. The FW2 firewall 31 remembers that the IP address 10.0.1.2 had established a UDP connection to address 240.1.1.2 on source port 10500 and destination port 10501. Because the UDP packet comes from said source address 240.2.1.2, on source port 10501 and to destination port 10500, the FW2 firewall 31 interprets the packet as return communication related to the connection established by the device 10.0.1.2. The firewall FW2 thereafter performs an address change operation. It changes the target address of the UDP packet to 10.0.1.2. Thereafter the FW2 firewall 31 routes the UDP packet to address 10.0.1.2. Now the home control network key 42 receives a message from the home control network device 61. A one-way data transfer connection from the home control network device 61 to the home control network key 42 now exists.

Next, the home control network key 42 sends the UDP packet to the address 240.1.1.2 on source port 10500 to the destination port 10501. The UDP packet arrives at the FW1 firewall 51. The FW1 firewall 51 remembers that the IP address 10.0.1.2 had established a UDP connection to address 240.2.1.2 on source port 10501 and destination port 10500. Because the UDP packet comes from said source address 240.2.1.2, on source port 10501 and to destination port 10500, the FW2 firewall 51 interprets the received packet as return communication related to the connection established by the device 10.0.0.2. The FW1 firewall 51 performs an address change, i.e. changes the target address of the packet to 10.0.0.2. Thereafter the FW1 firewall 51 routes the packet to address 10.0.0.2.

Now a two-way UDP connection exists between the home control network key 42 and the home control network device 61. These devices can communicate with each other bidirectionally. The home control network device 61 and the home control network key 42 advantageously form a data link layer level VPN tunnel between them, using for example the OpenVPN software.

The home control network device 61 advantageously bridges the created VPN tunnel 55 with the house control remote network 172.17.0.0/24, reference 6, administrated by it. In the same way the home control network key 42 bridges the created VPN tunnel 55 with its LAN port, so it is able to provide intranet interfaces in the network 172.17.0.0/24 on the data link layer level. After these operations the house control remote network 4 and the house control intranet 6 form a private VPN network over the Internet 2.

Example of Establishing a VPN Tunnel by Using UDP Port Scanning, Reference 2062, in the Arrangement of FIG. 1a:

The UDP port scanning can be utilised, if one element in the data transfer network changes either the source or the destination ports occasionally. The steps of the below described method differ from each other depending on the fact, whether the element changing the source or destination ports occasionally is in front of the sending or the receiving member.

1. Scanning on Source Ports:

The firewall 51 in front of the home control network device 61 changes only the source address of the sent packets, the source port is not changed.

The home control network device 61 begins the sending of UDP packets with the following information: source port 5000, source IP 10.0.0.2, destination IP 5.5.5.5, destination ports for example between 1024->1054 (30 different source ports). The data (payload) of every UDP packet includes the chosen destination port, for example 1024. By means of this it is known in the receiving end, to which port the sent packet went through the firewall 31.

The sending frequency of the UDP packets is advantageously 200 milliseconds. First, for example a UDP packet is sent on source port 1024, in 200 ms another UDP packet on source port 1025, etc. After the UDP packet on the last source port 1054 has been sent (after ca. 6 seconds), the home control network device 61 sends UDP packets again in the same order starting from the source port 1024.

Thereafter also the home control network key 42 starts to send UDP packets with the following information: source IP 10.0.1.2, target IP 6.6.6.6, destination port 5000, source ports for example between 1024->65535 (64511 different source ports). The sending frequency of the UDP packets is advantageously 50 milliseconds. That is, first for example a UDP packet is sent on source port 1024, in 50 ms another UDP packet on source port 1025, etc. The payload of every UDP packet includes the used source port, for example 1024. This information can be used to recognize, which one of the used source ports changes into which source port when it passes through the NAT firewall 51.

The aim is that during this step the UDP packet sent by the home control network key 42 gets through the firewall 51, or the UDP packet sent by the home control network device 61 gets through the firewall 31 of the home control network key 42. When one or the other of the devices sees the UDP packet coming through, to that UDP packet is responded to the same source port as from where the UDP packet was marked to be coming from. Thereafter the establishing of the VPN connection can be started.

Sending of the packets goes on until the connection is made to work or the connection establishing is cancelled.

2. Scanning on Destination Ports:

The NAT firewall 31 in front of the home control network key 42 changes the source address and the source port of the sent data packets. Typically, the source port changes occasionally, for example the source port 1024 may change for example into the source port 16431.

The home control network key 42 starts sending UDP packets with the following information: source port 5000, source IP 10.0.1.2, destination port 6.6.6.6, source ports for example between 1024->1054 (30 different source ports). The data (payload) of every UDP packet includes a source port, for example 1024. By means of this it is known in the receiving end, the UDP packet sent from which source port went through the firewall 31.

The sending frequency of the UDP packets is advantageously 200 milliseconds. First, for example, a UDP packet is sent on source port 1024, in 200 ms a UDP packet on source port 1025, etc. After the UDP packet on the last source port 1054 has been sent (after ca. 6 seconds), the home control network key 42 sends UDP packets again in the same order starting from the source port 1024.

Thereafter, the home control network device 61 starts sending UDP packets with the following information: source IP 10.0.0.2, destination IP 5.5.5.5, source port 5000, destination ports for example between 1024->65535 (64511 different destination ports). The sending frequency of the packets is advantageously 50 milliseconds. First, a UDP packet is sent on destination port 1024, in 50 ms on destination port 1025 etc. The payload of every UDP packet includes the destination port used by the packet, for example 1024. This information can be used to recognize, which one of the used destination ports changes into which destination port when it passes through the NAT firewall 31.

The aim is that during this step the UDP packet sent by the home control network key 42 gets through the firewall 51 in front of the home control network device 61, or the UDP packet sent by the home control network device 61 gets through the firewall 31 in the front of the home control network key 42. When one of the devices sees the UDP packet passing through, that packet is responded to the same source port from which the packet seems to be coming.

Sending of the packets continues until the connection is made to work or the connection establishing is cancelled.

In both of the above-mentioned cases establishing of the VPN connection can be started as follows:

The port trio used with the VPN connection:
source port used by the home control network device 61 (host1_real_source_port).
source port transformed by the NAT firewall 51 of the home control network device, which is the same as the destination port (host1_translated_source_port) used by the home control network key 42
destination port (host2_real_source_port) used by the home control network key 42.

The home control network device 61 opens the VPN connection:
destination IP 6.6.6.6
source port host1_real_source_port
source port host2_real_source_port
The home control network key 42 opens the VPN connection:
destination IP 5.5.5.5
source port host2_real_source_port
destination port host1_translated_source_port
Both NAT firewalls 31 and 51 believe that the connection was established from their own intranet, whereby the UDP connection is routed through the NAT firewalls 31 and 51.

Examples of Establishing a VPN Tunnel by Using an ICMP Protocol, Reference 2063, in the Arrangement of FIG. 1*a*:

The control protocol of the IP protocol can be utilised, if the network element in the data transfer network allows communication for ICMP ECHO and ICMP ECHO REPLY type packets.

ICMP Method 1: Permanent ICMP ECHO ID:

This embodiment is possible when the firewall(s) in the data transfer network(s) does/do not react to TTL expired messages.

The home control network key 42 sends an IP packet via router 10.0.1.1 with the following information: destination IP 6.6.6.6, source IP 10.0.1.2, TTL 1, type ICMP, ICMP type ECHO REQUEST, ID 1234, sequence 1 and the payload of the packet is empty.

The sent packet passes through the NAT firewall 31, whereby the source IP of the packet changes->5.5.5.5, the TTL of the packet changes 1->0. The NAT firewall 31 remembers that with the ID number 1234 the source IP 10.0.1.2 changed into 1 echo request.

The router in the Internet 2 (not shown in FIG. 1*a*), the exemplary IP address of which is 3.1.1.1, receives an IP packet, the TTL of which is 0. This router replies with an "ICMP TTL time to live expired" message to the firewall 31.

The firewall 31 receives an "ICMP TTL time to live expired" message, but, however, does not react to it.

The home control network device 61 sends an IP packet through router 10.0.0.1 with the following information: destination IP 5.5.5.5, source IP 10.0.0.2, TTL 255, type ICMP, ICMP type ECHO REPLY, ID 1234, Sequence 1 and the payload of the packet includes advantageously 30-1400 bytes of VPN communication.

The sent ICMP ECHO packet passes through the firewall 51, whereby the source IP of the packet changes->6.6.6.6. The ICMP packet reaches the firewall 31. The firewall 31 remembers that a request with ICMP ECHO ID number 1234 was sent earlier. The firewall 31 remembers that the sender of the request was device 10.0.1.2. The firewall 51 routes the packet further to address 10.0.1.2. The destination IP of the packet changes 5.5.5.5->10.0.1.2.

The home control network key 42 receives the ICMP ECHO packet and thus the home control network device 61 has successfully sent a packet of free-form data to the home control network key 42.

The home control network key 42 continues sending ICMP ECHO REQUEST packets, and the home control network device 61 continues sending ICMP ECHO REPLY messages, respectively. The home control network key 42 and the home control network device 61 have formed a one-way data transfer connection between themselves.

Next, the home control network key 42 and the home control network device 61 form also another, reverse ICMP connection. The connection is established as described above. Only the direction of the connection establishment changes. In the end of the connection establishment process the home control network device 61 receives the ICMP packet sent by the home control network key 42, the payload of which packet includes advantageously 30-1400 bytes of VPN communication.

The home control network key 42 and the home control network device 61 continue sending requests to each other as described above. Thus, a two-way connection now exists between the home control network key 42 and the home control network device 61. The ECHO REPLY messages comprise TLS-encrypted communication of the VPN connection, so that a direct VPN connection penetrating the NAT firewalls 31 and 51 has been successfully formed between the home control network key 42 and the home control network device 61.

ICMP Method 2: Variable ICMP ECHO ID:

The data transfer connection may have a network element, for example a firewall that handles the TTL messages (Time to Live expired) in that way that a new ICMP ECHO REQUEST is necessary, so that an ICMP ECHO REPLY would go through. Thereby every "TTL expired" message "eats" the place of one ICMP ECHO REPLY packet. When this kind of a network element sees a "TTL expired" message, it does not route an "ICMP ECHO REPLY" message to the destination any more.

The difference of this method to the case of a permanent ICMP ECHO ID is that an ICMP ECHO ID is different in every ICMP ECHO REQUEST and ICMP ECHO REPLY packet pair. Sending of an ICMP ECHO REQUEST and ICMP ECHO REPLY packet pair takes place synchronized on the basis of time so that ICMP ECHO REQUEST and ICMP ECHO REPLY are sent substantially simultaneously. Thereby the ICMP ECHO REQUEST gets out of the NAT firewall of the sending member before the ICMP ECHO REPLY of the other device gets onto the same firewall.

Advantageously, a great value is used as the TTL value, so that the ICMP ECHO REQUEST packet would stay on the way as long as possible before the firewall receives either a "TTL expired" or a "wrong" "ICMP ECHO REPLY from the firewall of the other end.

In the Following, an Example of this IMPC ECHO Method in the Case of FIG. 1a:

The home control network key 42 sends an IP packet via router 10.0.0.1 with the following information: destination IP 6.6.6.6, source IP 10.0.1.2, TTL 255, type ICMP, ICMP type ECHO REQUEST, ID 1000, Sequence 1 and the payload of the packet is empty.

Simultaneously, the home control network device 61 sends an IP packet with the following information: destination IP 5.5.5.5, source IP 10.0.0.2, TTL 255, type ICMP, ICMP type ECHO REPLY, ID 1000, Sequence 1. The payload of the packet includes in its beginning the number "2000", whereupon follows the requested sending frequency (for example 500 ms) of the ICMP ECHO REQUEST, and thereafter free-formed VPN communication, advantageously 30-1400 bytes.

The ICMP ECHO REQUEST packet sent by the home control network key 42 passes through the NAT firewall 31. Thereby the source IP of the packet changes->5.5.5.5. The NAT firewall 31 remembers that with the ID number 1000 the source IP 10.0.0.2 became one ICMP ECHO REQUEST.

Simultaneously, the ICMP ECHO REQUEST packet sent by the home control network device 61 passes through the NAT firewall 51. Thereby the source IP of the packet changes->6.6.6.6. The NAT firewall 51 remembers that with the ID number 1000 the source IP 10.0.0.2 became ICMP ECHO REQUEST.

The sent ICMP ECHO REQUEST packets "pass" each other in the Internet 2, that is, both packets are on the way in the network of the operator at the same time.

The ICMP ECHO REQUEST packet arrives at the firewall 51 and the firewall 51 replies thereto. The result of the reply is not significant, because the ICMP ECHO REPLY sent by the home control network device 61 has been sent before the ICMP ECHO REPLY packet sent by the firewall 51. It is also not important if the firewall 51 does not reply to the ICMP ECHO REQUEST packet.

The ICMP ECHO REPLY packet sent by the home control network device 61 reaches the firewall 31. The firewall 31 remembers that an ICMP ECHO packet with ID number 1000 was sent earlier. The firewall 31 remembers that the sender of the request was device 10.0.1.2. The firewall 31 routes the packet further to address 10.0.1.2 by changing the destination IP of the packet 5.5.5.5->10.0.1.2.

The home control network key 42 receives the ICMP packet and thus the home control network device 61 has successfully sent an ICMP packet of free-form data to the home control network key 42.

Next, the home control network key 42 and the home control network device 61 form also another, reverse ICMP connection. The connection is established as described above. Only the direction of the connection establishment changes. In the end of the connection establishing process the home control network key 42 receives a packet, the payload of which includes VPN communication advantageously of 30-1400 bytes.

The home control network device 61 and the home control network key 42 continue sending ICMP ECHO REQUEST and ICMP ECHO REPLY packet pairs so that every ICMP packet pair has a different ECHO ID. Thus, the ICMP ECHO REPLY or TTL time to live exceeded messages sent by the firewalls 31 and 51 do not impede the communication.

The home control network device 61 and the home control network key 42 agree among themselves on ECHO ID numbers and sending frequency advantageously first by means of a separate home control network server 21 and upon establishment of the data transfer connection directly to each other in the beginning of the payload of the ICMP ECHO REPLY packets. In the beginning of the ICMP REPLY packets, in every packet the previous ECHO REQUEST ID, sent by the respective device, and the sending frequency requested by the device for the ECHO REQUEST packets, is notified. Thus, both devices know which ECHO ID needs to be sent in the next ECHO REQUEST packet and when the next ECHO REQUEST needs to be sent. If for example in the ECHO REPLY packet the requested sending frequency is 500 ms, the device sends its ECHO REQUEST packet always when the time from the moment of establishment of the connection in milliseconds is divisible by 500.

Examples of Establishing a VPN Tunnel by Using a TCP Protocol, Reference 2064, in the Arrangement of FIG. 1a:

An assisted TCP relay connection functions in sense of data security correspondingly to any other connection, for example a normal direct UDP connection between two devices. The VPN connection is not opened with a used TCP relay server, but the encrypting takes place in the terminal devices establishing the connection. Breaking into the TCP relay server cannot break the established VPN connection, and the home control network key according to the invention cannot be cheated to connect to a wrong device.

Example of a TCP Relay Connection Establishment:

The public IP address of the home control network key 42 is 5.5.5.5, the public IP address of the home control network device 61 is 6.6.6.6, and the public IP address of the TCP relay server (home control network server 21) is 7.7.7.7.

The home control network key 42 makes a TCP connection to address 7.7.7.7 and to its port 443. The TCP relay server sees the requested connection and accepts it. The TCP handshaking takes place and the TCP channel is opened. The home control network key 42 sends unique information of the connection along the TCP channel (e.g. Connection ID) to the TCP relay server.

The TCP relay server receives the information and by means of this can later link the received connection to the right home control network device 61.

The home control network device 61 makes a TCP connection to address 7.7.7.7, to port 443. The TCP relay server sees the requested connection and accepts it. The TCP handshaking takes place and the TCP channel is opened. The home control network device 61 sends unique information of the connection along the TCP channel (e.g. Connection ID) to the TCP relay server.

The TCP relay server receives the information and by means of this the TCP relay server knows later, to which home control network key 42 the home control network device 61 is to be connected.

The TCP relay server starts transmitting messages between the home control network key 42 and the home control network device 61 between the TCP connections. The TCP relay server reads data from the TCP connection coming from the home control network key 42 and transmits the data as such to the TCP connection of the home control network device 61. Accordingly, the TCP relay server reads data from the connection of the home control network device 61 and transmits the read data as such to the TCP connection of the home control network key 42. Data transmission is continued bidirectionally until the other TCP connection is interrupted. When the other TCP connection is interrupted, also the other TCP connection is interrupted by the TCP relay server.

Figure 4:
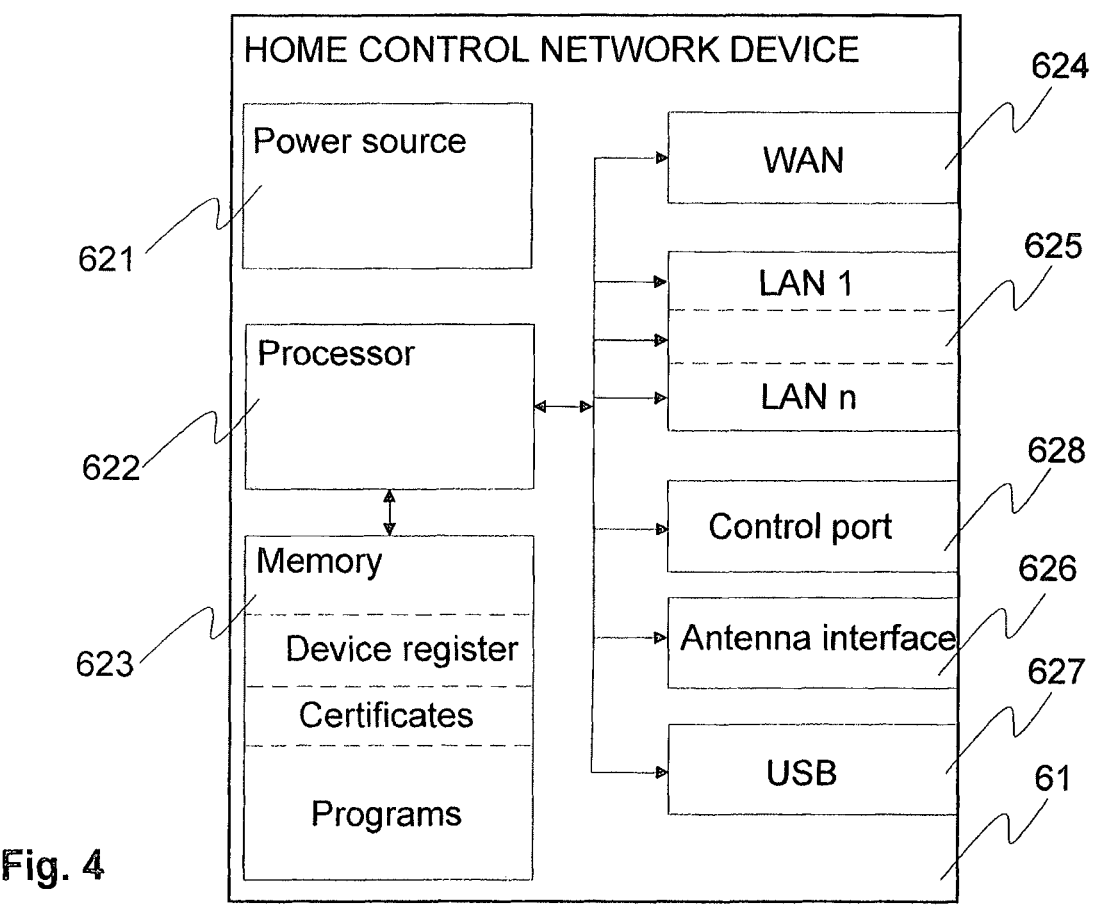
FIG. 4 shows by way of example a home control network device according to the invention.

FIG. 4 shows the functional main parts of the home control network device 61 according to the invention. The home control network device 61 has a power source 621. It can be an accumulator or a power source based on mains current. All the electric components of the home control network device get their operating voltage from the power source 621.

The home control network device 61 has one or more processors 622. The processor or processor means can comprise an arithmetic logic unit, a group of different registers and control circuits. A data storing arrangement 623, such as a memory unit or memory means, whereon computer-readable information or programs or user information can be stored, has been connected to the processor means. The memory means 623 typically contain memory units, which allow both reading and writing functions (Random Access Memory, RAM), and memory units containing non-volatile memory, from which data can only be read (Read Only Memory, ROM). The device register, certificates to be utilised in the establishment of the VPN connection, the current network path information and all the programs needed for the operation of the home control network device 61 are advantageously stored in the memory means.

Some examples of programs stored in the memory of the home control network device 61 are an operating system (e.g. Linux), TCP/IP programs, a VPN program (e.g. OpenVPN), a DHCP client device/server program (e.g. ISC DHCP), a DNS server program (e.g. dnsmasq), a database program (e.g. SQLite), a remote control program (e.g. OpenSSH), a certificate management/confirmation program (e.g. GPG) and a user interface library (e.g. LuCI).

The home control network device 61 also comprises interface elements, which comprise an input/output or input/output means 624, 625, 626, 627 and 628 for receiving or sending information. The information received with the input means is transferred to be processed by the processor means 622 of the home control network device 61. The interface elements of the home control network device transfer information either to the data transfer network or to external data processing devices. The interface elements of the home control network device 61 are advantageously a WAN port 624, one or more LAN ports 625, an antenna port 626, a USB port 627 and a control port 628. The pairing of the home control network device 61 and the home control network key 42 or 41*c* can advantageously be done for example via the USB port 627.

It is obvious to someone skilled in the art that the functions of the home control network device 61 can be integrated as a part of a computerised or house engineering device, which has a sufficient processor and memory capacity and connecting means for connecting various technical means thereto either with a wired data transfer connection or a wireless data transfer connection. This computerised device, in which the functions of the home control network device are integrated, is connected to some data transfer network 5, from which there is access to the public Internet.

Figure 5A:
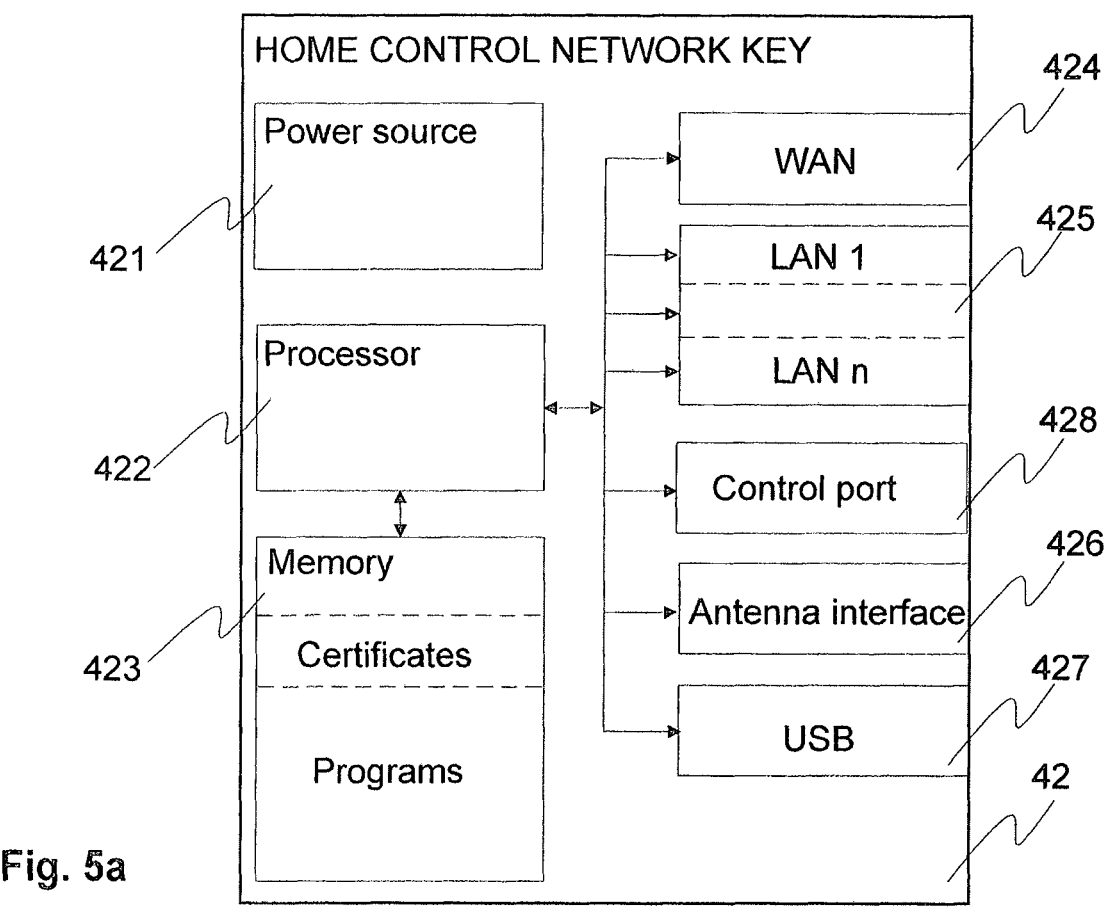
FIG. 5a shows by way of example a home control network key according to the invention.

FIG. 5*a* shows the functional main parts of the home control network key 42 according to the invention. The home control network device 42 has a power source 421. It can be an accumulator or a power source based on mains current. All the electric components of the home control network device get their operating voltage from the power source 421.

The home control network key 42 may comprise one or several processors 422. The processor or processor means can comprise an arithmetic logic unit, a group of different registers and control circuits. A data storing arrangement 423, such as a memory unit or memory means, whereon computer-readable information or programs or user information can be stored, has been connected to the processor means. The memory means 423 typically contain memory units, which allow both reading and writing functions (Random Access Memory, RAM), and memory units containing non-volatile memory, from which data can only be read (Read Only Memory, ROM). The certificates to be utilised in the establishment of the VPN connection, the current network path information and all the programs needed for the operation of the home control network device 42 are advantageously stored in the memory means.

Some examples of programs stored in the memory of the home control network key 42 are an operating system (e.g. Linux), TCP/IP programs, a VPN program (e.g. OpenVPN), a DHCP client device/server program (e.g. ISC DHCP), a DNS server program (e.g. dnsmasq), a database program (e.g. SQLite), a remote control program (e.g. OpenSSH), a certificate management/confirmation program (e.g. GPG) and a user interface library (e.g. LuCI).

The home control network key 42 also comprises interface elements, which comprise an input/output or input/output means 424, 425, 426, 427 and 428 for receiving or sending information. The information received with the input means is transferred to be processed by the processor means 422 of the home control network key 42. The interface elements of the home control network device transfer information either to the data transfer network or to external data processing devices. The interface elements of the home control network device 42 are advantageously a WAN port 424, one or more LAN ports 425, an antenna port 426, a USB port 427 and a control port 428.

Figure 5B:
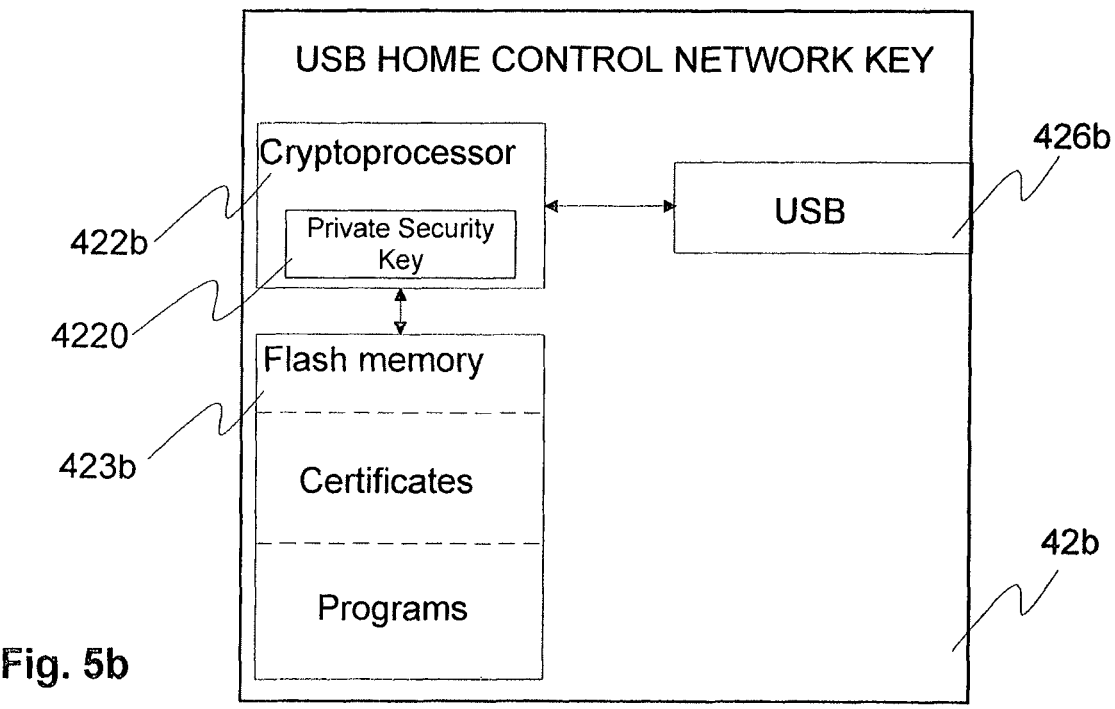
FIG. 5b shows by way of example another home control network key according to the invention.

FIG. 5b shows the functional main parts of a home control network key 42b according to a second embodiment of the invention. The home control network key 42b according to this embodiment may comprise one or several cryptoprocessors 422b. The processor or processor means can comprise an arithmetic logic unit, a group of different registers and control circuits. A cryptoprocessor 422b comprises advantageously an internal memory unit, in which an individual private cryptographic key has been stored.

A data storing arrangement 423b, such as a Flash memory unit or memory means, whereon computer-readable information or programs or user information can be stored, has been connected to the processor means. The memory means 423b typically contain memory units, which allow both reading and writing functions (Random Access Memory, RAM), and memory units containing non-volatile memory, from which data can only be read (Read Only Memory, ROM). The identification information of the home control network key 42b, its current network path, The certificates to be utilised in the establishment of the VPN connection, the current network path information the identification information of the home control network device 61 functioning as its device pairs and all the programs needed for the operation of the home control network key 42b are advantageously stored in the memory means.

Some examples of programs stored in the memory of the home control network key 42b are an operating system (e.g. Linux), TCP/IP programs, a VPN program (e.g. OpenVPN), a DHCP client device/server program (e.g. ISC DHCP), a database program (e.g. SQLite), a certificate management/confirmation program (e.g. GPG) and a user interface library (e.g. LuCI).

The home control network key 42 also comprises interface elements, which comprise an input/output or input/output means 426b for receiving or sending information. The information received with the input means is transferred to be processed by the processor means 422b of the home control network key 42b. The interface elements of the home control network device are advantageously used to transfer information from the memory 423b of the home control network key either to an external data processing device 41c or to the home control network device 61. Correspondingly information or commands can be received via the interface elements for example from the data processing device, to which the home control network key 42b is connected.

With regards to their access right levels there are at least two levels of the above-described home control network keys 42 or 42b, for example administrator and basic user level key devices. A higher access right level key device user/owner (e.g. an administrator) has control right to all control targets of home control network key users on a lower level (such as basic users). An owner of a lower level key device access right level does on the other hand not have access to any other higher access right level control target than his own targets.

Figure 6:
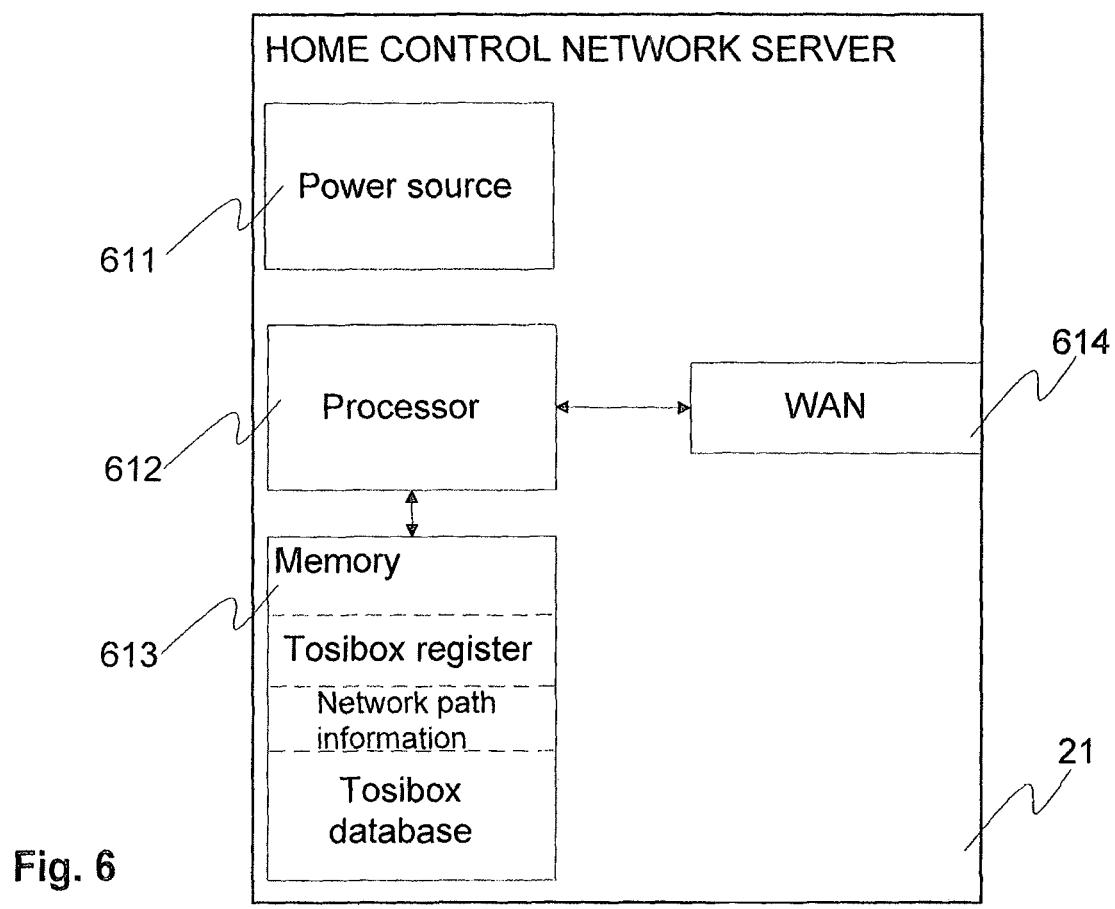
FIG. 6 shows by way of example a home control network server according to the invention.

FIG. 6 shows the functional main parts of the home control network server 21. The home control network server 21 functions advantageously also as a TCP relay server. The home control network server 21 comprises a power source 611. It can be an accumulator or a power source based on mains current. All the electric components of the home control network server 21 get their operating voltage from the power source 611.

The home control network server 21 has one or more processors 212. The processor or processor means can comprise an arithmetic logic unit, a group of different registers and control circuits. A data storing arrangement 613, such as a memory unit or memory means, whereon computer-readable information or programs or user information can be stored, has been connected to the processor means. The memory means 613 typically contain memory units, which allow both reading and writing functions (Random Access Memory, RAM), and memory units containing non-volatile memory, from which data can only be read (Read Only Memory, ROM). The identification information of the device pairs in the remote control system (Tosibox register), the current network path information of each device pair, all the programs needed for establishing the VPN data transfer connection to be established between the device pairs and the Tosibox database are advantageously stored in the memory means.

Some examples of programs stored in the memory of the home control network server 21 are an operating system (e.g. Linux), TCP/IP programs, a DHCP server/client device program (e.g. ISC DHCP), a DNS server program (e.g. bind), a database program (e.g. SQLite), a certificate management/confirmation program (e.g. GPG) and a user interface library (e.g. LuCI).

The home control network server 21 also comprises interface elements, which comprise an input/output or input/output means 614 for receiving or sending information. The information received with the input means is transferred to be processed by the processor means 612 of the home control network device 21. The interface elements of the home control network server transfer information either to the data transfer network or to external data processing devices. The interface element of the home control network server 21 is advantageously a WAN port 614.

The home control network server 21 advantageously also comprises a user interface (not shown in FIG. 6), which comprises means for receiving information from the server 21 user. The user interface can comprise a keyboard, a touch screen, a microphone and a speaker.

Figure 7:
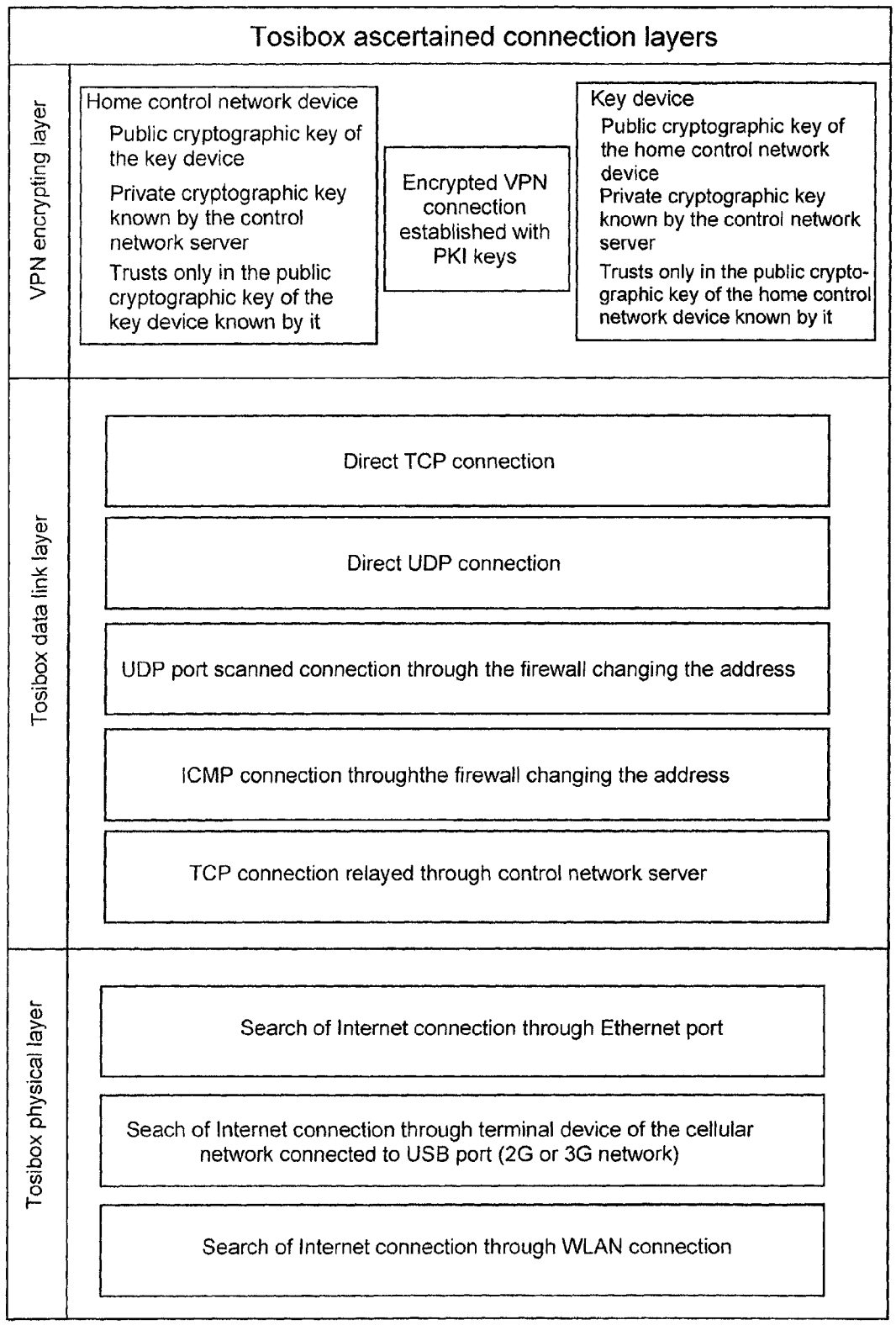
FIG. 7 shows connection layers according to the invention, utilised in the home control network system.

FIG. 7 shows the data link layers (Tosibox layers) utilised in the data transfer between the home control network device 61, home control network key 42, 42b and home control network server 21.

The physical Tosibox layer comprises alternatives for establishing a physical data transfer connection between two devices participating in the remote-controlling. A data transfer connection can be established, for example, by coupling the devices at their Ethernet ports to the local Ethernet network, which has connection to the Internet. Alternatively, the data transfer connection can be established into the local WLAN network, from which there is a connection to the Internet. The third alternative is to form a 2G or 3G data transfer connection. In this embodiment, a terminal device establishing a 2G or 3G connection is connected to the USB port of the home control network device and/or the home control network key.

The Tosibox data link layer comprises connection establishment procedures that can be utilised in a packet-coupled with VPN data transfer connection. Alternative or parallel connection establishment procedures include a direct TCP data transfer connection between the members, a direct UDP data transfer connection between the members, a data transfer connection established by using port scanning, a data transfer connection based on ICMP ECHO messages between the members, or a relayed data transfer connection established through the home control network server (TCP relay member).

The VPN encrypting layer comprises the encrypting procedures (individual, private cryptographic key and a public cryptographic key of the home control network key) known by the home control network device 61 and the encrypting procedures (individual, private cryptographic key and the public key of the home control network device) known by the home control network key 42, 42b. With these encrypting procedures the home control network device 61 and the home control network key 42, 42b are able to establish a secure VPN data transfer connection by using a PKI encrypting procedure (Public Key Infrastructure).

Some procedures utilised in establishing of the VPN data transfer connection of the remote control system according to the invention have been described above. Further, advantageous embodiments of components implementing these procedures in the remote control system are described. The invention is not limited to the solutions described above, but the inventive idea can be applied in numerous ways within the scope of the claims.

The invention claimed is:

1. A method for providing a virtual private network between a home control network key and a home control network device of the actuators of the remote control system in a property, wherein
both the home control network key and the home control network device that form a predetermined network terminal pair, the members of which are allowed to communicate only with each other and a home control server, send at times a poll to the home control network server, in which it is asked whether the other device of the network terminal pair is connected to the data transfer network, and if it is, then
both the home control network key and the home control network device make a connection to the home control network server in order to establish a virtual private network and request the routing information from the home control network server in order to establish an end-to-end data transfer connection between said network terminal pair
the home control network server checks whether both the home control network key and the home control network device are the predetermined network terminal pair
the home control network server sends both to the home control network key and the home control network device the requested routing information after it has checked that the network terminals are the predetermined network terminal pair, and that
the home control network key and the home control network device start simultaneously with a plurality of establishing methods of the virtual private network an establishing process of the end-to-end data transfer connection in order to provide at least one virtual private network between the home control network key and the home control network device.

2. The remote control method according to claim 1, wherein the virtual private network is established as a direct TCP data transfer connection between the network terminal pair, as a direct UDP data transfer connection between the network terminal pair, by using UDP port scanning between the network terminal pair by utilising ICMP ECHO messages of the IP control protocol between the network terminal pair or with a TCP data transfer connection relayed via the home control network server.

3. The method according to claim 2, wherein at least the relayed virtual TCP private network via the home control server is released, if the virtual private network has been established also with another method of establishing the virtual private network.

4. A home control network key for actuators in a property, comprising
network interface elements, which comprise input/output means for network interfaces
a processor and
a memory, which contains computer program code wherein the processor, the memory and the computer program code stored therein are configured to
send at times a poll to a home control network server, in which it is asked whether a home control network device predetermined to be a network terminal pair of the home control network key, with which home control network device the home control network key is only allowed to communicate, is connected to the data transfer network, and if it is, then
make a connection to the home control network server and to request a routing information of the home control network device from the home control network server in order to establish a virtual private network to the home control network device
receive the routing information of the home control network device from the home control network server if the home control network key and the home control network device are checked to be the predetermined network terminal pair by the home control network server, and
start simultaneously with a plurality of establishing methods of the virtual private network an establishing process of an end-to-end data transfer connection in order to provide at least one end-to-end virtual private network with the home control network device.

5. The home control network key according to claim 4, wherein the home control network key is configured to establish a virtual private network as a direct TCP data transfer connection to the home control network device, as a direct UDP data transfer connection to the home control network device, by using UDP port scanning with the home control network device, by utilising ICMP ECHO messages of the IP control protocol with the home control network device or to establish a TCP data transfer connection relayed via the home control network server to the home control network device.

6. The home control network key according to claim 5, wherein the home control network key is configured to release at least the relayed virtual TCP private network via the home control server, if the virtual private network has been established also with another method of establishing the virtual private network.

7. A home control network device for actuators in a property, comprising
network interface elements, which comprise input/output means for network interface
a processor and
a memory, which contains computer program code wherein the processor, the memory and the computer program code stored therein are configured to
send at times a poll to a home control network server, in which it is asked whether a home control network key predetermined to be a network terminal pair of the home control network device, with which home control network key the home control network device is only allowed to communicate, is connected to the data transfer network, and if it is, make a connection to the home control network server and to request a routing information of the home control network key from the home control network server in order to establish a virtual private network to the home control network key receive the routing information of the home control network key from the home control network server if the home control network key and the home control network device are checked to be the predetermined network terminal pair by the home control network server, and start simultaneously with a plurality of establishing methods of the virtual private network an establishing process of an end-to-end data transfer connection in order to provide at least one end-to-end virtual private network with the home control network key.

8. The home control network device according to claim 7, wherein the home control network key is configured to establish a virtual private network as a direct TCP data transfer connection to the home control network key, as a direct UDP data transfer connection to the home control network key, by using UDP port scanning with the home control network key, by utilising ICMP ECHO messages of the IP control protocol with the home control network key or to establish a TCP data transfer connection relayed via the home control network server to the home control network key.

9. The home control network device according to claim 8, wherein the home control network key is configured to release at least the relayed virtual TCP private network via the home control server, if the virtual private network has been established also with another method of establishing the virtual private network.

10. A home control network server, comprising
network interface elements, which comprise input/output means
a processor and
a memory, which contains computer program code,
wherein the processor, the memory and the computer program code stored therein are configured to
store in the memory of the home control network server an identification information of a network terminal pair formed by a home control network key and a home control network device used for remote-controlling of a property
receive from the network terminal pair the network path information determined by the network pair
receive from home control network key a routing information request of its network terminal pair
check, which is the home control network device functioning as the predetermined network terminal pair of the home control network key that made the routing information request, with which the home control network key is only allowed to communicate, based on the identification information of the network terminal pair stored in the memory of the home control network server
send the routing information of the network terminal pair both to the home control network key and the home control network device, if both the home control network key and the home control network device are connected to the data transfer network and if the home control network key and the home control network device are checked to be the predetermined network terminal pair
send information which indicates a free part of an allowed cyberspace to the home control network device and
release the data transfer connection to the network terminal pair, when at least one direct virtual private network has been successfully established between the home control network key and the home control network device.

11. A non-transitory computer-readable medium with computer executable instructions stored thereon executed by a processor for providing home control network key functions, comprising:
code means for determining the routing information from a home control network key to the Internet
code means for sending at times a poll to a home control network server, in which it is asked whether a home control network device with which the home control network key forms a predetermined network terminal pair, the members of which are allowed to communicate only with each other, is connected to the data transfer network, and if it is, then
code means for making a connection to the home control network server and for requesting a routing information of the home control network device from the home control network server in order to establish a virtual private network to the home control network device
code means for receiving the routing information of the home control network device from the home control network server if the home control network key and the home control network device are checked to be the predetermined network terminal pair by the home control network server, and
code means for starting simultaneously with a plurality of establishing methods of the virtual private network an establishing process of an end-to-end data transfer connection in order to provide at least one direct end-to-end virtual private network with the home control network device.

12. The non-transitory computer-readable medium according to claim 11, wherein the home control network key further comprises code means which is configured to establish a virtual private network as a direct TCP data transfer connection to the home control network device, as a direct UDP data transfer connection to the home control network device, by using UDP port scanning with the home control network device, by utilising ICMP ECHO messages of the IP control protocol with the home control network device or to establish a TCP data transfer connection relayed via the home control network server to the home control network device.

13. The non-transitory computer-readable medium according to claim 12, further comprising code means which is configured to release at least the relayed virtual TCP private network via the home control server, if the virtual private network has been established also with another method of establishing the virtual private network.

14. A non-transitory computer-readable medium with computer executable instructions stored thereon executed by a processor for providing home control network device functions, comprising
code means for determining the routing information from a home control network device to the Internet
code means for sending at times a poll to a home control network server, in which it is asked whether a home control key with which the home control network device forms a predetermined network terminal pair, the members of which are allowed to communicate only with each other, is connected to the data transfer network, and if it is code means for making a connection to the home control network server and to request a routing information of the home control network key from the home control network server in order to establish a virtual private network to the home control network key, code means for receiving the routing information of the home control network key from the home control network server if the home control network key and the home control network device are checked to be the predetermined network terminal pair by the home control network server, and code means for starting simultaneously with a plurality of establishing methods of the virtual private network an establishing process of an end-to-end data transfer connection in order to provide at least one direct end-to-end virtual private network with the home control network key.

15. The non-transitory computer-readable medium according to claim 14, further comprising code means which is configured to establish a virtual private network as a direct TCP data transfer connection to the home control network key, as a direct UDP data transfer connection to the home control network key, by using UDP port scanning with the home control network key, by utilising ICMP ECHO messages of the IP control protocol with the home control network key or for establishing a TCP data transfer connection relayed via the home control network server to the home control network key.

16. The non-transitory computer-readable medium according to claim 15, further comprising code means which is configured to release at least the relayed virtual TCP private network via the home control server, if the virtual private network has been established also with another method of establishing the virtual private network.

* * * * *